(12) United States Patent
Kuntagod et al.

(10) Patent No.: US 10,963,043 B2
(45) Date of Patent: Mar. 30, 2021

(54) UTILIZING MACHINE LEARNING TO DETERMINE SURVEY QUESTIONS BASED ON CONTEXT OF A PERSON BEING SURVEYED, REACTIONS TO SURVEY QUESTIONS, AND ENVIRONMENTAL CONDITIONS

(71) Applicant: Accenture Global Solutions Limited, Dublin (IE)

(72) Inventors: Nataraj Kuntagod, Bangalore (IN); Anutosh Maitra, Bangalore (IN); Satya Sai Srinivas, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/661,306

(22) Filed: Oct. 23, 2019

(65) Prior Publication Data
US 2020/0150752 A1 May 14, 2020

(30) Foreign Application Priority Data

Nov. 12, 2018 (IN) .............................. 201841042459

(51) Int. Cl.
*G06F 3/01* (2006.01)
*G10L 25/63* (2013.01)
*G10L 25/78* (2013.01)
*G06N 20/20* (2019.01)
*G06K 9/00* (2006.01)

(52) U.S. Cl.
CPC .......... *G06F 3/011* (2013.01); *G06K 9/00302* (2013.01); *G06N 20/20* (2019.01); *G10L 25/63* (2013.01); *G10L 25/78* (2013.01); *G06F 2203/011* (2013.01); *G10L 2025/783* (2013.01)

(58) Field of Classification Search
CPC ............ G06Q 30/0203; G06Q 30/0245; G06F 2203/011; G06F 9/00302; G06N 20/20; G06N 20/00; G10L 25/63; G06K 9/72
See application file for complete search history.

(56) References Cited

U.S. PATENT DOCUMENTS

| 9,603,564 B2* | 3/2017 | Forbes ................... A61B 5/165 |
| 9,865,281 B2* | 1/2018 | Dow ...................... G10L 25/57 |
| 10,049,263 B2* | 8/2018 | Hau ................... G06K 9/00302 |
| 2013/0038756 A1* | 2/2013 | Cheng .............. H04N 21/44213 348/231.99 |

(Continued)

*Primary Examiner* — Alvin H Tan
(74) *Attorney, Agent, or Firm* — Harrity & Harrity, LLP

(57) ABSTRACT

A device may receive human-related data associated with a surveyor and a surveyed person participating in an interview, and may receive environmental data. The device may determine, based on rules, that first portions of the human-related data and environmental data are more reliable than second portions, and may process the first portions of the human-related data and the environmental data, with a first model, to determine high-reliability context data. The device may process the second portions of the human-related data and the environmental data, with a second model, to determine low-reliability context data, and may process the high-reliability context data and the low-reliability context data, with a third model, to generate weighted context data. The device may process the weighted context data, with a fourth model, to calculate a total stress factor, and may perform actions based on the total stress factor.

20 Claims, 17 Drawing Sheets

(56) References Cited

U.S. PATENT DOCUMENTS

| | | | |
|---|---|---|---|
| 2018/0089605 A1* | 3/2018 | Poornachandran | ............................ G06Q 10/06393 |
| 2018/0150739 A1* | 5/2018 | Wu | ................... G06Q 10/1053 |
| 2019/0110728 A1* | 4/2019 | Sbodio | ................... A61B 5/165 |
| 2020/0092419 A1* | 3/2020 | Murali | ................... G10L 25/63 |

\* cited by examiner

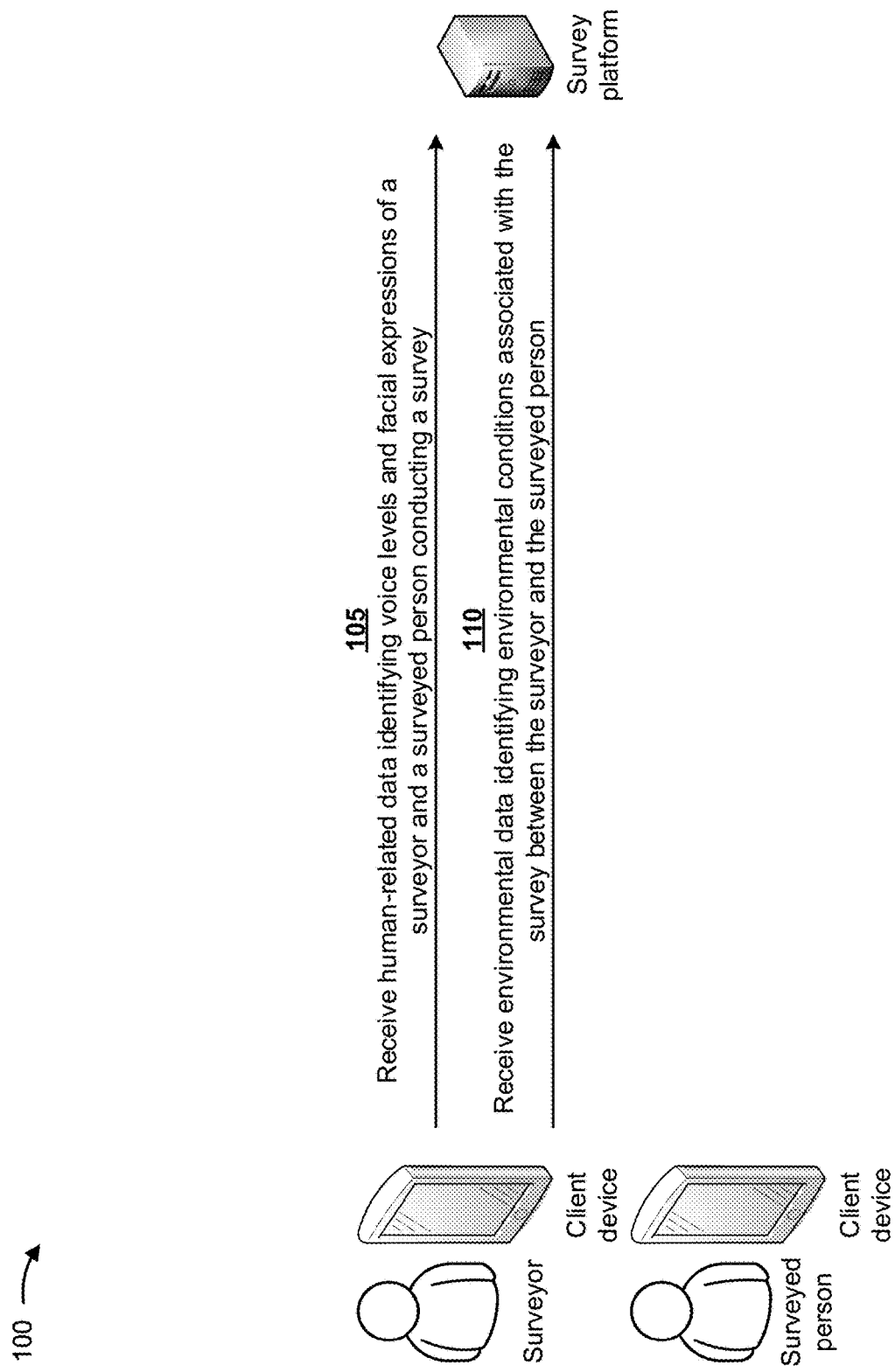

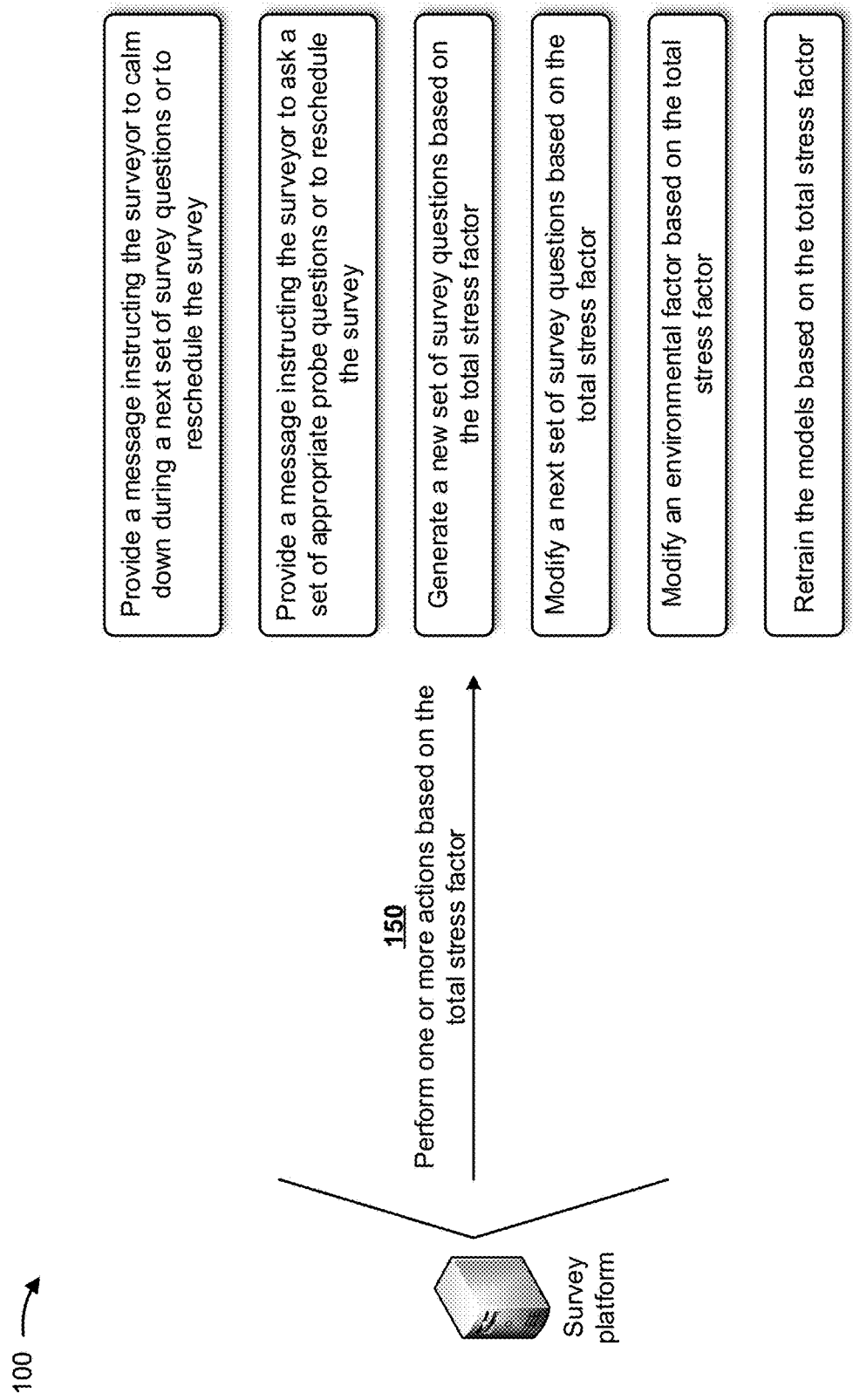

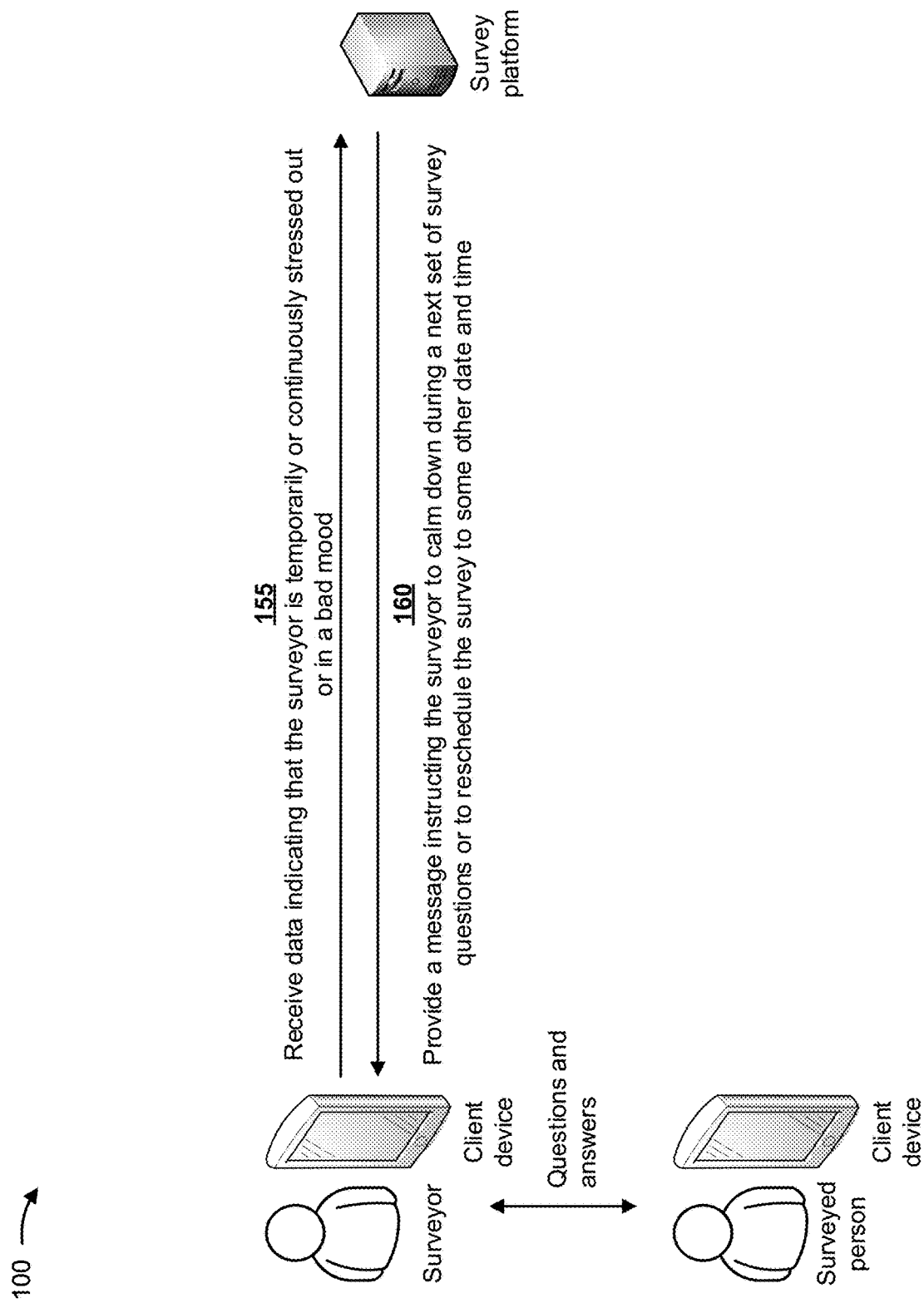

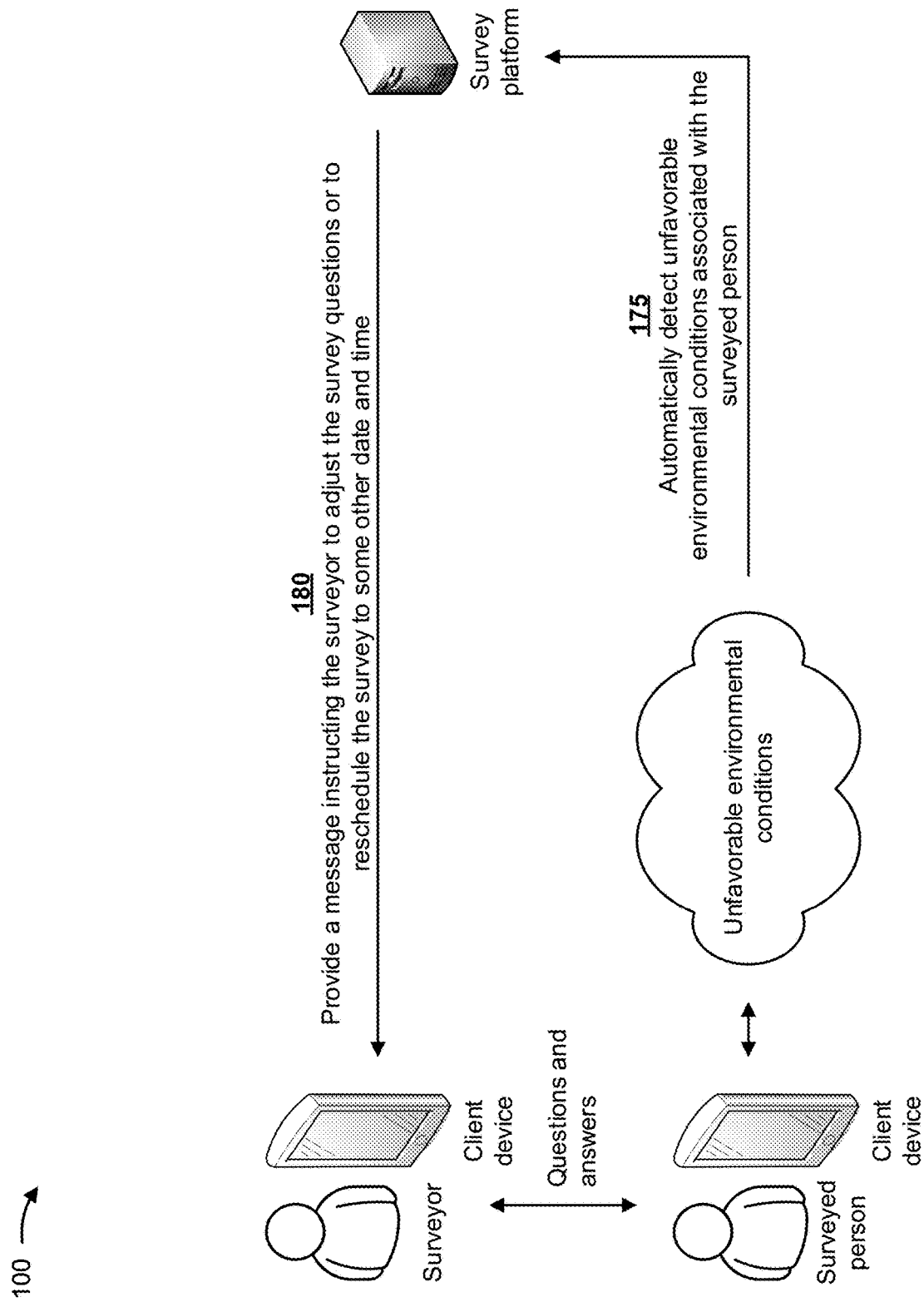

UTILIZING MACHINE LEARNING TO DETERMINE SURVEY QUESTIONS BASED ON CONTEXT OF A PERSON BEING SURVEYED, REACTIONS TO SURVEY QUESTIONS, AND ENVIRONMENTAL CONDITIONS

RELATED APPLICATION

This application claims priority under 35 U.S.C. § 119 to Indian Patent Application No. 201841042459, filed on Nov. 12, 2018, and entitled "AUTOMATICALLY DETERMINING SURVEY QUESTIONS BASED ON AN AMBIENT SITUATIONAL CONTEXT OF A PERSON BEING SURVEYED, A DYNAMIC REACTION TO SURVEY QUESTIONS BY THE PERSON, AND AN ENVIRONMENTAL CONTEXT IMPACT ON THE PERSON," the content of which is incorporated by reference herein in its entirety.

BACKGROUND

Surveys are a common way to understand realities of a situation when no other reliable data sources are available. Surveys are conducted for resource-constrained environments where there are no data sources to formulate a particular topic. For example, many healthcare and public service policies are created for emerging economies based on surveys, since there are no reliable data sources that are current and accurate.

SUMMARY

According to some implementations, a method may include receiving human-related data identifying voice levels and facial expressions of a surveyor and a surveyed person participating in an interview, and receiving environmental data identifying environmental conditions associated with the interview between the surveyor and the surveyed person. The method may include determining, based on rules, that first portions of the human-related data and environmental data are more reliable than second portions of the human-related data and the environmental data, and processing the first portions of the human-related data and the environmental data, with a first machine learning model, to determine high-reliability context data for the interview. The method may include processing the second portions of the human-related data and the environmental data, with a second machine learning model, to determine low-reliability context data for the interview, and processing the high-reliability context data and the low-reliability context data for the interview, with a third machine learning model, to generate weighted context data. The method may include processing the weighted context data, with a fourth machine learning model, to calculate a total stress factor for the interview, and performing one or more actions based on the total stress factor for the interview.

According to some implementations, a device may include one or more memories, and one or more processors to receive human-related data identifying voice levels and facial expressions of a surveyor and a surveyed person participating in an interview, and receive environmental data identifying environmental conditions associated with the interview between the surveyor and the surveyed person. The one or more processors may determine, based on rules, that first portions of the human-related data and environmental data are more reliable than second portions of the human-related data and the environmental data, and may process the first portions of the human-related data and the environmental data, with a first machine learning model, to determine high-reliability context data for the interview. The one or more processors may process the second portions of the human-related data and the environmental data, with a second machine learning model, to determine low-reliability context data for the interview, and may process the high-reliability context data and the low-reliability context data for the interview, with a third machine learning model, to generate weighted context data. The one or more processors may process the weighted context data, with a fourth machine learning model, to calculate a total stress factor for the interview, and may process the total stress factor for the interview, with a fifth machine learning model, to determine a next question for the interview or to determine to end the interview. The one or more processors may provide the next question or an instruction to end the interview to a client device associated with the surveyor.

According to some implementations, a non-transitory computer-readable medium may store one or more instructions that, when executed by one or more processors of a device, may cause the one or more processors to receive human-related data identifying voice levels and facial expressions of a surveyor and a surveyed person participating in an interview, and receive environmental data identifying environmental conditions associated with the interview between the surveyor and the surveyed person. The one or more instructions may cause the one or more processors to process first portions of the human-related data and the environmental data, with a first machine learning model, to determine high-reliability context data for the interview, and process second portions of the human-related data and the environmental data, with a second machine learning model, to determine low-reliability context data for the interview, wherein the first portions of the human-related data and the environmental data are determined to be more reliable than the second portions of the human-related data and the environmental data. The one or more instructions may cause the one or more processors to process the high-reliability context data and the low-reliability context data for the interview, with a third machine learning model, to generate weighted context data, and process the weighted context data, with a fourth machine learning model, to calculate a total stress factor for the interview. The one or more instructions may cause the one or more processors to perform one or more actions based on the total stress factor for the interview.

BRIEF DESCRIPTION OF THE DRAWINGS

FIGS. 1A-1L are diagrams of one or more example implementations described herein.

DETAILED DESCRIPTION

Figure 1B:
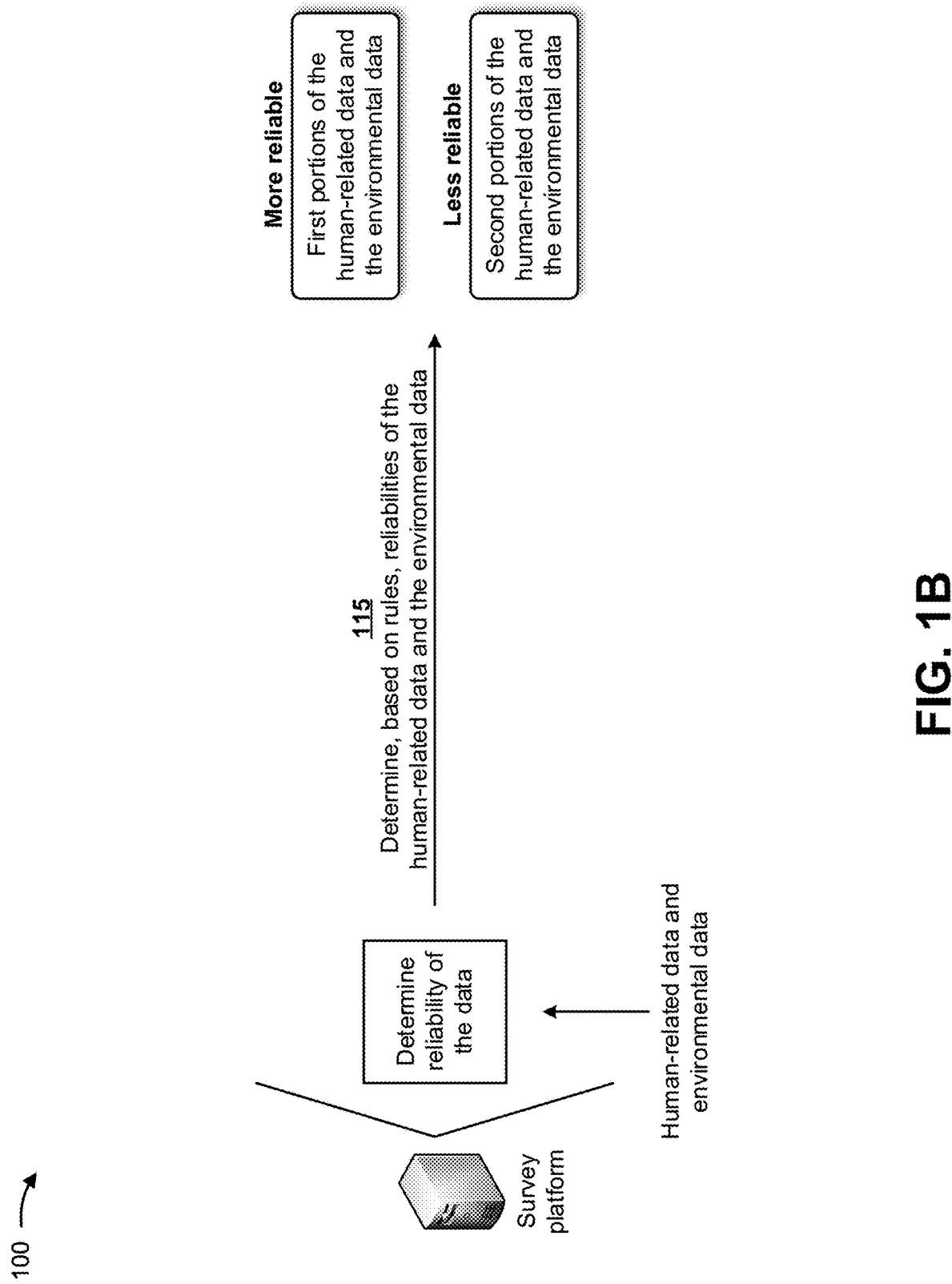

The following detailed description of example implementations refers to the accompanying drawings. The same reference numbers in different drawings may identify the same or similar elements.

Current survey techniques have several issues. For example, survey context, question wording, and answer alternatives affect survey participation and answers, and have implications when comparing studies and/or performing pooled analyses. Context effects may bias answers provided by survey respondents, which reduces accuracies associated with the answers and increases errors in survey measurement. These issues are more apparent when a population surveyed is from underserved communities with low tolerance to situational context. Furthermore, surveys are taken with minimal inputs on survey context, and with the assumption that survey answers are of high reliability, resulting in policies and interventions being generated based on this assumption, which may not be accurate. Thus, current survey techniques waste computing resources (e.g., processing resources, memory resources, communication resources, and/or the like), networking resources, and/or the like in generating unreliable survey results, performing additional surveys to improve the reliability of overall survey results, reviewing results of the additional surveys, and/or the like.

Some implementations described herein provide a survey platform that utilizes machine learning to determine survey questions based on context of a person being surveyed, reactions to survey questions, and environmental conditions. For example, the survey platform may receive human-related data identifying voice levels and facial expressions of a surveyor and a surveyed person participating in an interview, and may receive environmental data identifying environmental conditions associated with the interview between the surveyor and the surveyed person. The survey platform may determine, based on rules, that first portions of the human-related data and environmental data are more reliable than second portions of the human-related data and the environmental data, and may process the first portions of the human-related data and the environmental data, with a first machine learning model, to determine high-reliability context data for the interview. The survey platform may process the second portions of the human-related data and the environmental data, with a second machine learning model, to determine low-reliability context data for the interview, and may process the high-reliability context data and the low-reliability context data for the interview, with a third machine learning model, to generate weighted context data. The survey platform may process the weighted context data, with a fourth machine learning model, to calculate a total stress factor for the interview, and may perform one or more actions based on the total stress factor for the interview.

In this way, the survey platform determines survey questions based on context of a person being surveyed, reactions to survey questions, environmental conditions, and/or the like. This, in turn, conserves computing resources, networking resources, and/or the like that would otherwise be wasted in generating unreliable survey results, performing additional surveys to improve the reliability of overall survey results, reviewing results of the additional surveys, and/or the like. Furthermore, the survey platform further conserves computing resources, networking resources, and/or the like that would otherwise be wasted in asking unnecessary questions, continuing a fruitless survey, reperforming a survey with unreliable results, and/or the like.

FIGS. 1A-1L are diagrams of one or more example implementations 100 described herein. As shown in FIG. 1A, example implementation 100 may include client devices (e.g., mobile phones, sensors, tablet computers, desktop computers, and/or the like) associated with a surveyor, a surveyed person (e.g., a survey participant), and a survey platform. The survey platform may include a platform that utilizes machine learning to determine survey questions based on context of the surveyed person, reactions to survey questions, environmental conditions, and/or the like.

As further shown in FIG. 1A, and by reference number 105, the survey platform may receive human-related data from the client devices. In some implementations, the survey platform may receive sensor data (e.g., camera data from a camera in a client device, microphone data from a microphone in a client device, and/or the like) associated with the surveyor and/or the surveyed person, and may utilize one or more application programming interfaces (APIs) to extract the human-related data from the sensor data. The human-related data may include data (e.g., parameters) identifying emotions associated with the surveyor and/or the surveyed person, heart rates associated with the surveyor and/or the surveyed person, voice levels associated with the surveyor and/or the surveyed person, facial expressions associated with the surveyor and/or the surveyed person, and/or the like. The survey platform may periodically receive the human-related data, may continuously receive the human-related data, may receive the human-related data prior to the surveyor asking a question (e.g., of a series of questions) of the surveyed person, and/or the like. The survey platform may store the human-related data in a data structure (e.g., a database, a table, a list, and/or the like) associated with the survey platform.

As further shown in FIG. 1A, and by reference number 110, the survey platform may receive environmental data from the client devices and/or other sources (e.g., cameras, microphones, thermometers, network routers, network connections, light sensors, sound sensors, and/or the like). The environmental data may include data (e.g., parameters) identifying light intensity associated with the surveyor and/or the surveyed person, noise levels associated with the surveyor and/or the surveyed person, environmental temperatures associated with the surveyor and/or the surveyed person, environmental weather associated with the surveyor and/or the surveyed person, a day of the survey, a time of day of the survey, network speeds associated with the client devices, and/or the like. In some implementations, the survey platform may receive sensor data (e.g., camera data, microphone data, light sensor data, sound sensor data, thermometer data, network data, and/or the like) associated with an environment of the interview, and may utilize one or more APIs to extract the environmental data from the sensor data. The survey platform may periodically receive the environmental data, may continuously receive the environmental data, may receive the environmental data prior to the surveyor asking a question (e.g., of a series of questions) of the surveyed person, and/or the like. The survey platform may store the environmental data in the data structure associated with the survey platform.

In some implementations, the survey platform may assign values to the parameters associated with the human-related data and the environmental data. For example, the survey platform may assign values to dark, normal, or bright intensity levels of an environmental light intensity parameter based on input from a camera; may assign values to loud, normal, or feeble volume levels of an environmental noise volume parameter based on input from a microphone; may assign values to hot, normal, or cold temperature levels of a temperature parameter based on input from a thermometer; may assign values to rainy or normal weather of a weather parameter based on a weather sensor, may assign values to morning, afternoon, or evening times of day of a time parameter based on input from a clock of the client device; may assign values to tense or normal emotions of an emotion parameter based on input from a camera; may assign values to high or normal heart rates of a heart rate parameter based on input from a heart rate monitor; may assign values to attentive, uninterested, or fatigued emotions of an eye-tracking parameter based on input from a camera; may assign values to aggressive, self-controlled, or depressed emotions of a voice parameter based on input from a microphone; and/or the like.

In some implementations, the survey platform may monitor, collect and/or maintain additional data, such as network data (e.g., network speed, bandwidth, connection status, and/or the like), sensor data (e.g., camera resolution, video frame rate, microphone type, sound frequency range, and/or the like), data associated with a location of the surveyed person (e.g., date, time of day, weather conditions, and/or the like), and/or the like. In some implementations, the survey platform may receive the additional data from the client device of the surveyor, the client device of the surveyed person, sensors, a data source, and/or the like.

As shown in FIG. 1B, and by reference number 115, the survey platform may determine, based on rules, reliabilities of the human-related data and the environmental data. For example, the survey platform may determine, based on the rules, that first portions of the human-related data and the environmental data are more reliable than second portions of the human-related data and the environmental data, where the first portions are more reliable than the second portions of the human-related data and the environmental data. In some implementations, the rules may include a rule based on a network speed (e.g., of a network associated with the client device of the surveyor or a client device of the surveyed person) satisfying a network speed threshold, a rule based on noise (e.g., of a room associated with the surveyor, a room associated with the surveyed person, and/or the like) satisfying a noise level threshold, rules based on the parameter values of the human-related data and the environmental data, rules based on the additional data, and/or the like.

For example, the survey platform may determine that the first portions of the human-related data and the environmental data satisfy the network speed threshold, and may determine that the second portions of the human-related data and the environmental data fail to satisfy the network speed threshold. Based on these determinations, the survey platform may determine, based on the network speed rule, that the first portions of the human-related data and the environmental data are more reliable than the second portions of the human-related data and the environmental data.

Figure 1C:
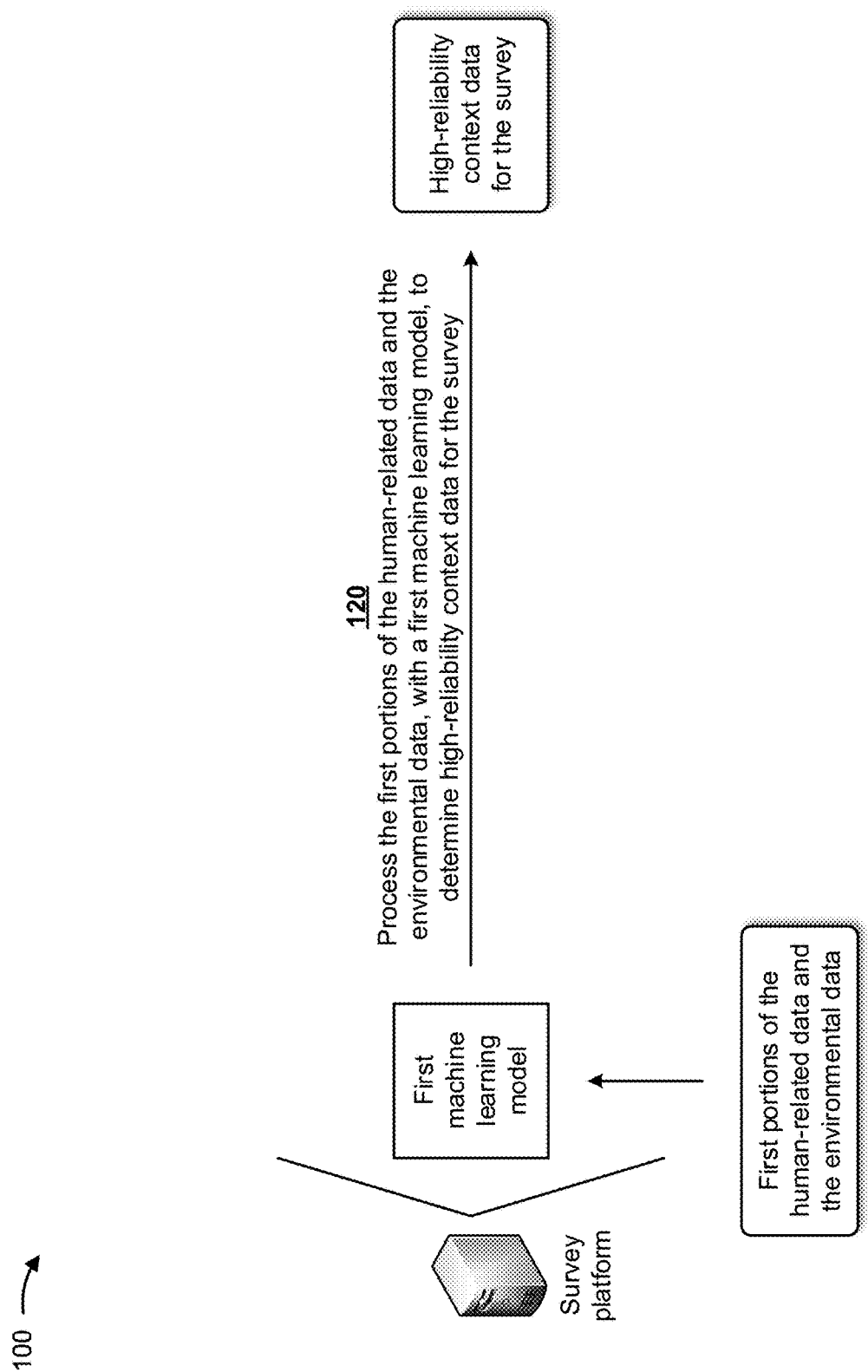

As shown in FIG. 1C, and by reference number 120, the survey platform may process the first portions of the human-related data and the environmental data, with a first machine learning model, to determine high-reliability context data for the survey. The first machine learning model may include a voice analysis model, an image analysis model, a heart rate model, and/or the like that extracts high-reliability context data (e.g., human-related context, such as a mood or stress level of the surveyor or the surveyed person; environmental context, such as a noisy environment, a low light environment; and/or the like) from the first portions of the human-related data and the environmental data. In some implementations, the first machine learning model may perform calls to APIs (e.g., a voice analysis API, an image analysis API, a heart rate API, and/or the like) associated with software that is stored and/or executed remotely from the client device of the surveyor (e.g., on a server) to perform voice analysis, image analysis, heart rate calculations, and/or the like.

In some implementations, the survey platform may train the first machine learning model with historical human-related data and historical environmental data. For example, the survey platform may train the first machine learning model to extract context from the historical human-related data and the historical environmental data. In some implementations, the survey platform may separate the historical human-related data and historical environmental data into a training set, a validation set, a test set, and/or the like. The training set may be utilized to train the first machine learning model. The validation set may be utilized to validate results of the trained first machine learning model. The test set may be utilized to test operation of the trained first machine learning model.

In some implementations, the survey platform may train the first machine learning model using, for example, an unsupervised training procedure and based on the historical human-related data and historical environmental data. For example, the survey platform may perform dimensionality reduction to reduce the historical human-related data and historical environmental data to a minimum feature set, thereby reducing resources (e.g., processing resources, memory resources, and/or the like) to train the neural network, and may apply a classification technique to the minimum feature set.

In some implementations, the survey platform may use a logistic regression classification technique to determine a categorical outcome (e.g., predicting context from the historical human-related data and the historical environmental data). Additionally, or alternatively, the survey platform may use a naïve Bayesian classifier technique. In this case, the survey platform may perform binary recursive partitioning to split the historical human-related data and historical environmental data into partitions and/or branches, and use the partitions and/or branches to determine outcomes (e.g., predicting context from the historical human-related data and the historical environmental data). Based on using recursive partitioning, the survey platform may reduce utilization of computing resources relative to manual, linear sorting and analysis of data points, thereby enabling use of thousands, millions, or billions of data points to train the first machine learning model, which may result in more accurate models than using fewer data points.

Additionally, or alternatively, the survey platform may use a support vector machine (SVM) classifier technique to generate a non-linear boundary between data points in the training set. In this case, the non-linear boundary is used to classify test data into a particular class.

Additionally, or alternatively, the survey platform may train the first machine learning model using a supervised training procedure that includes receiving input to the first machine learning model from a subject matter expert, which may reduce an amount of time, an amount of processing resources, and/or the like to train the first machine learning model relative to an unsupervised training procedure. In some implementations, the survey platform may use one or more other model training techniques, such as a latent semantic indexing technique, and/or the like. For example, the survey platform may perform an artificial neural network processing technique (e.g., using a two-layer feedforward neural network architecture, a three-layer feedforward neural network architecture, and/or the like) to perform pattern recognition with regard to patterns of the historical human-related data and historical environmental data. In this case, using the artificial neural network processing technique may improve an accuracy of the trained first machine learning model by the survey platform by making the model more robust to noisy, imprecise, or incomplete data, and by enabling the survey platform to detect patterns and/or trends undetectable to human analysts or systems using less complex techniques.

In some implementations, rather than training the first machine learning model, the survey platform may obtain the trained first machine learning model from another system or device that trained the first machine learning model to generate the trained first machine learning model. In this case, the survey platform may provide the other system or device with the historical human-related data and historical environmental data for use in training the first machine learning model, and may provide the other system or device with updated historical human-related data and updated historical environmental data to retrain the first machine learning model in order to update the trained first machine learning model.

Figure 1D:
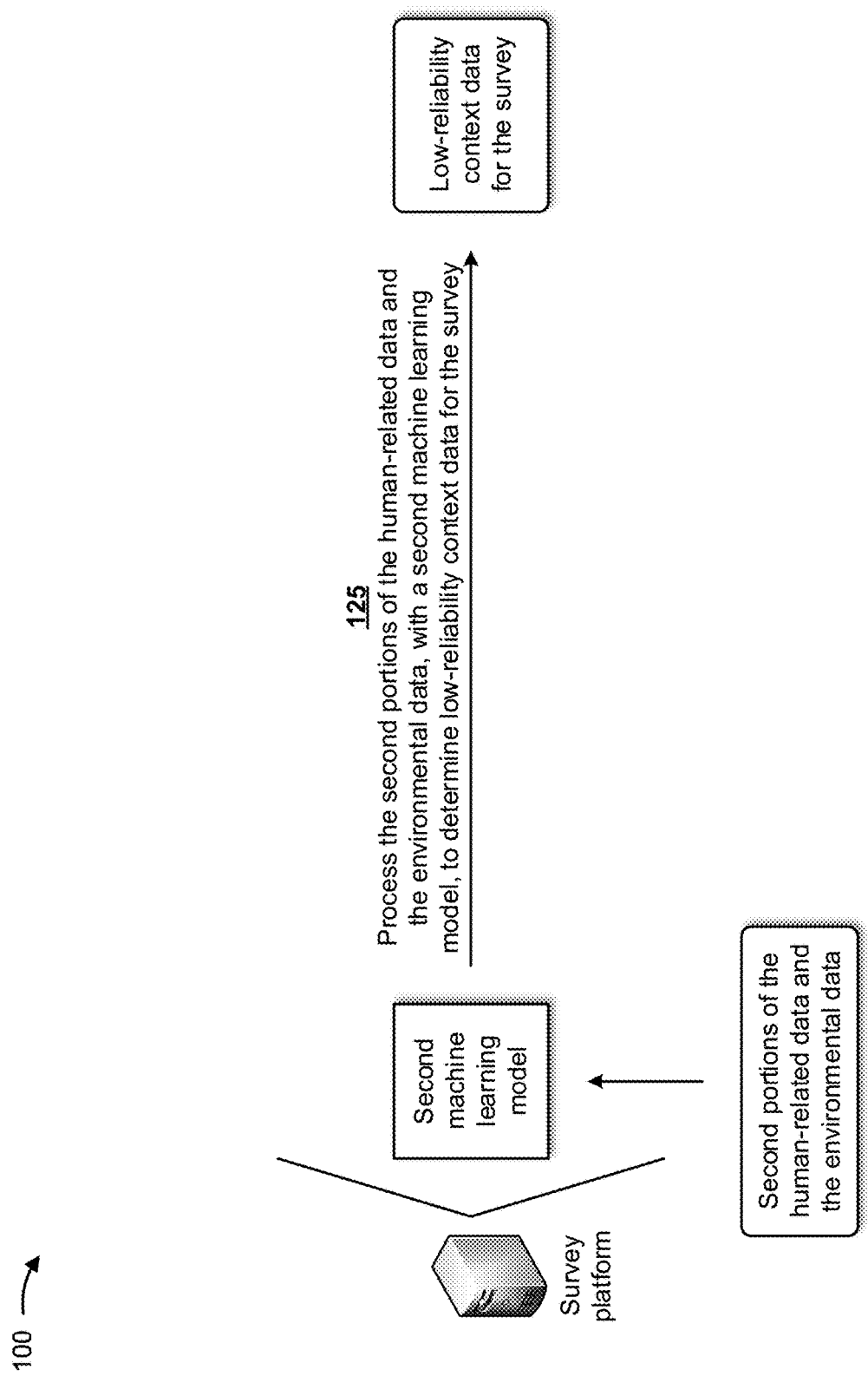

As shown in FIG. 1D, and by reference number 125, the survey platform may process the second portions of the human-related data and the environmental data, with a second machine learning model, to determine low-reliability context data for the survey. The second machine learning model may include a local learned machine learning model, a combination of the local learned machine learning model and human augmentation, and/or the like that extracts low-reliability context data (e.g., human-related context, such as a mood or stress level of the surveyor or the surveyed person; environmental context, such as a noisy environment, a low light environment; and/or the like) from the second portions of the human-related data and the environmental data.

In some implementations, the survey platform may train the second machine learning model with historical human-related data and historical environmental data to extract context from the historical human-related data and the historical environmental data. For example, the survey platform may train the second machine learning model in a manner similar to the first machine learning model described above in connection with FIG. 1C. In some implementations, rather than training the second machine learning model, the survey platform may obtain the second machine learning model from another system or device that trained the second machine learning model. In this case, the survey platform may provide the other system or device with the historical human-related data and the historical environmental data for use in training the second machine learning model, and may provide the other system or device with updated historical human-related data and updated historical environmental data to retrain the second machine learning model in order to update the second machine learning model.

In this way, the survey platform may process the different portions of the human-related data and environmental data with different machine learning models, so that the survey platform may utilize the best available machine learning models to extract context from the human-related data and environmental data.

Figure 1E:
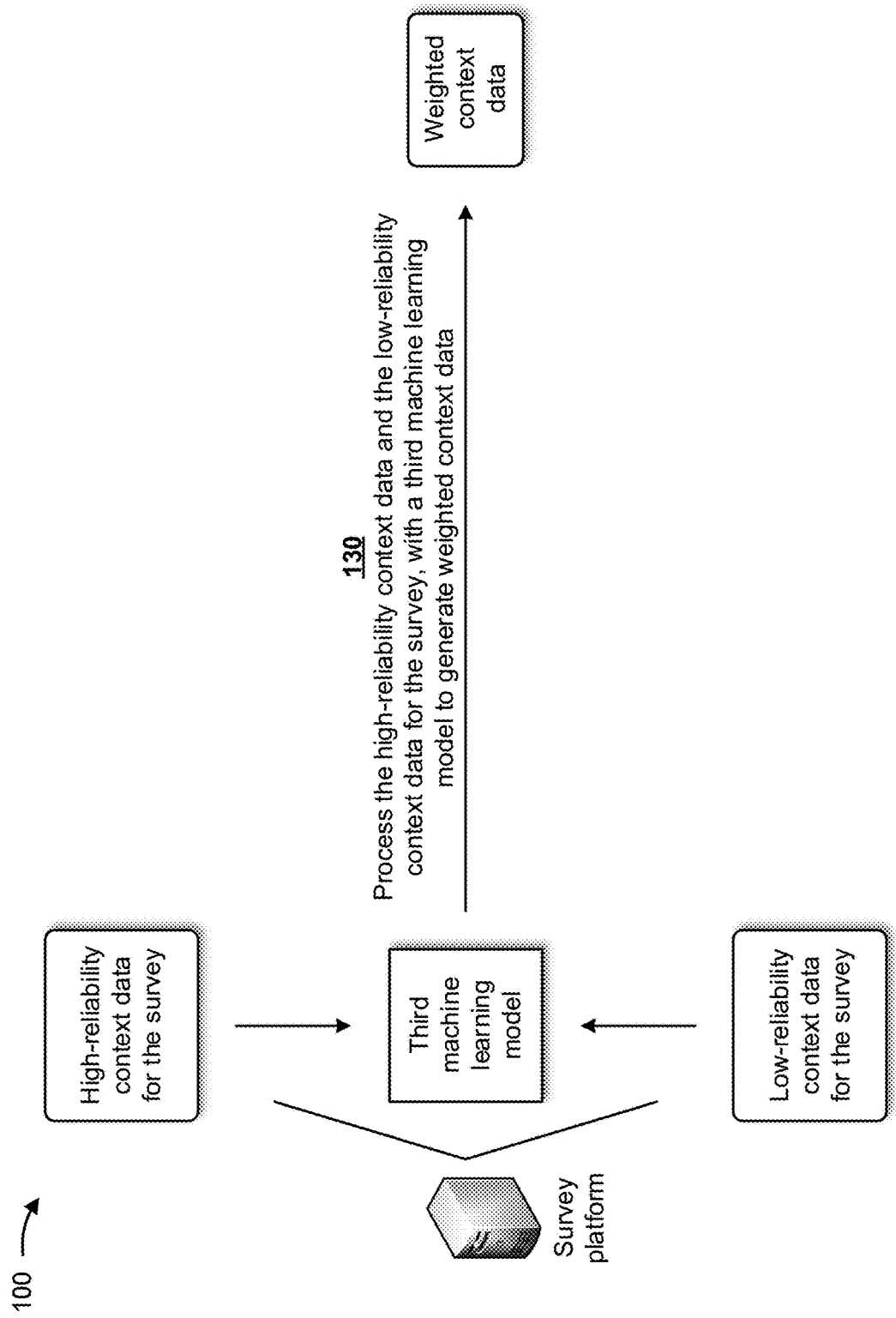

As shown in FIG. 1E, and by reference number 130, the survey platform may process the high-reliability context data and the low-reliability context data for the survey, with a third machine learning model, to generate weighted context data. In some implementations, the third machine learning model may apply greater weights to the high-reliability context data generated by the first machine learning model and may apply lesser weights to the low-reliability context data generated by the second machine learning model to generate the weighted context data. For example, when calculating an emotional state of the surveyed person based on a facial expression and a voice level of the surveyed person, the third machine learning model may weight the emotional state of the surveyed person differently depending on the facial expression and the voice level of the surveyed person.

In another example, if an environment volume of a surveyed person is loud, the third machine learning model may assign a lesser weight to voice data and a greater weight to eye-tracking data. As another example, if a light intensity of an environment of the surveyed person is dark, the third machine learning model may assign a greater weight to voice data and a lesser weight to eye-tracking data. As still another example, if weather associated with the surveyed person is rainy, the third machine learning model may assign a lesser weight to voice data and a lesser weight to eye-tracking data.

In some implementations, the survey platform may train the third machine learning model with historical high-reliability context data and historical low-reliability context data, to generate weighted context data. For example, the survey platform may train the third machine learning model in a manner similar to the first machine learning model described above in connection with FIG. 1C. In some implementations, rather than training the third machine learning model, the survey platform may obtain the third machine learning model from another system or device that trained the third machine learning model. In this case, the survey platform may provide the other system or device with the historical high-reliability context data and the historical low-reliability context data for use in training the third machine learning model, and may provide the other system or device with updated historical high-reliability context data and updated historical low-reliability context data to retrain the third machine learning model in order to update the third machine learning model.

Figure 1F:
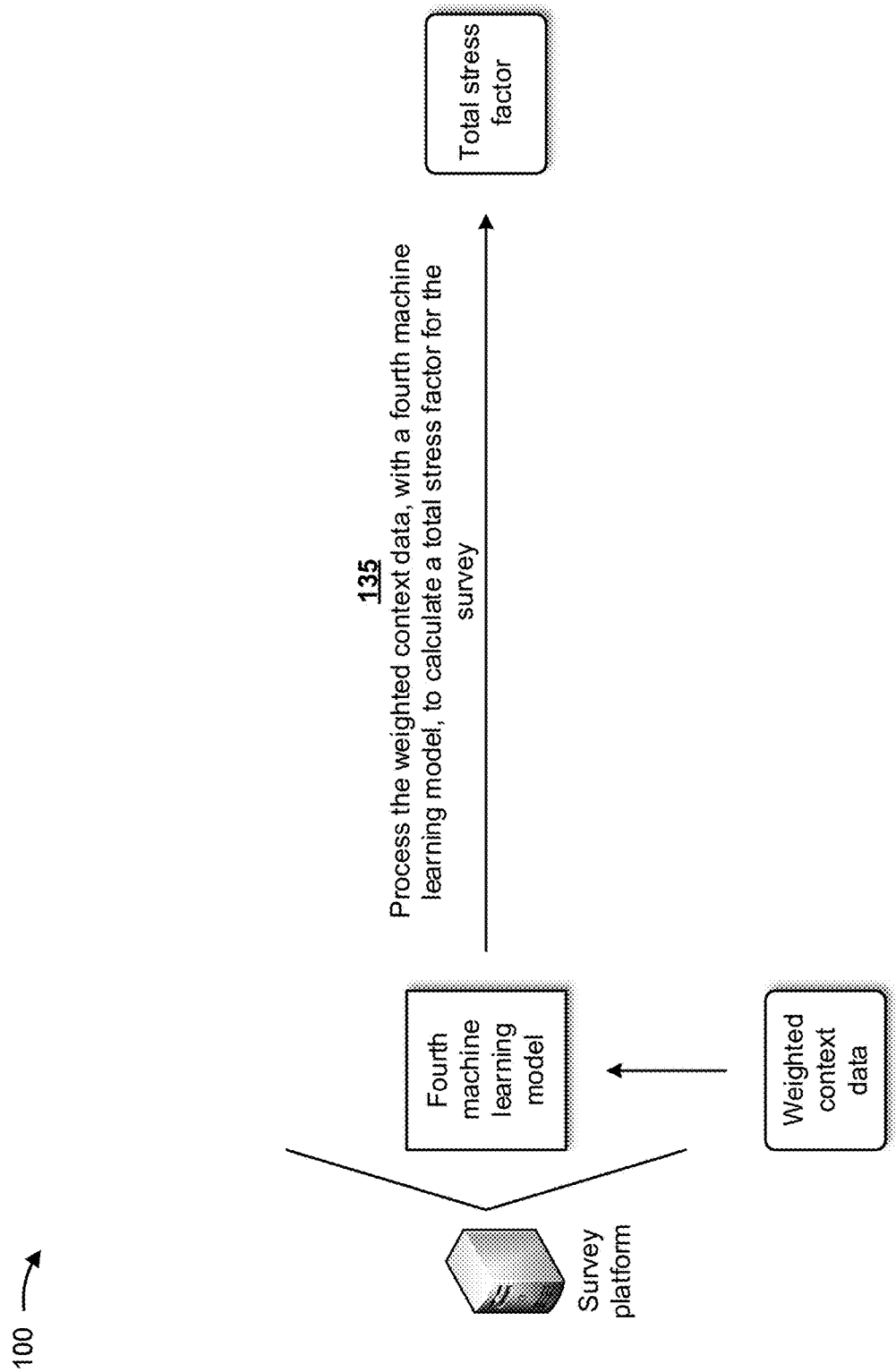

As shown in FIG. 1F, and by reference number 135, the survey platform may process the weighted context data, with a fourth machine learning model, to calculate a total stress factor for the survey. In some implementations, the fourth machine learning model may include a classification model, a score card model, a collaborative filtering model, and/or the like that calculates the total stress factor for the survey based on the weighted context data. The total stress factor may include one or more classifications, ranks, scores, and/or the like associated with a stress level of the surveyor (e.g., a surveyor stress level), a stress level of the surveyed person (e.g., a participant stress level), a stress level associated with an environment of the survey (e.g., an ambient stress level), and/or the like. The fourth machine learning model may determine the ambient stress level based on automatic detection of ambient conditions that may adversely impact answers of the surveyed person to survey questions. For example, the ambient conditions may include conditions caused by influencers (e.g., individuals who may bias or impact the answers of the surveyed person, environmental influences, and/or the like), such as crying children, sick family members, occurrence of severe weather, a time of day, and/or the like.

In some implementations, the survey platform may train the fourth machine learning model with historical weighted context data, to generate a total stress factor for the survey. For example, the survey platform may train the fourth machine learning model in a manner similar to the first machine learning model described above in connection with FIG. 1C. In some implementations, rather than training the fourth machine learning model, the survey platform may obtain the fourth machine learning model from another system or device that trained the fourth machine learning model. In this case, the survey platform may provide the other system or device with the historical weighted context data for use in training the fourth machine learning model, and may provide the other system or device with updated historical weighted context data to retrain the fourth machine learning model in order to update the fourth machine learning model.

Figure 1G:
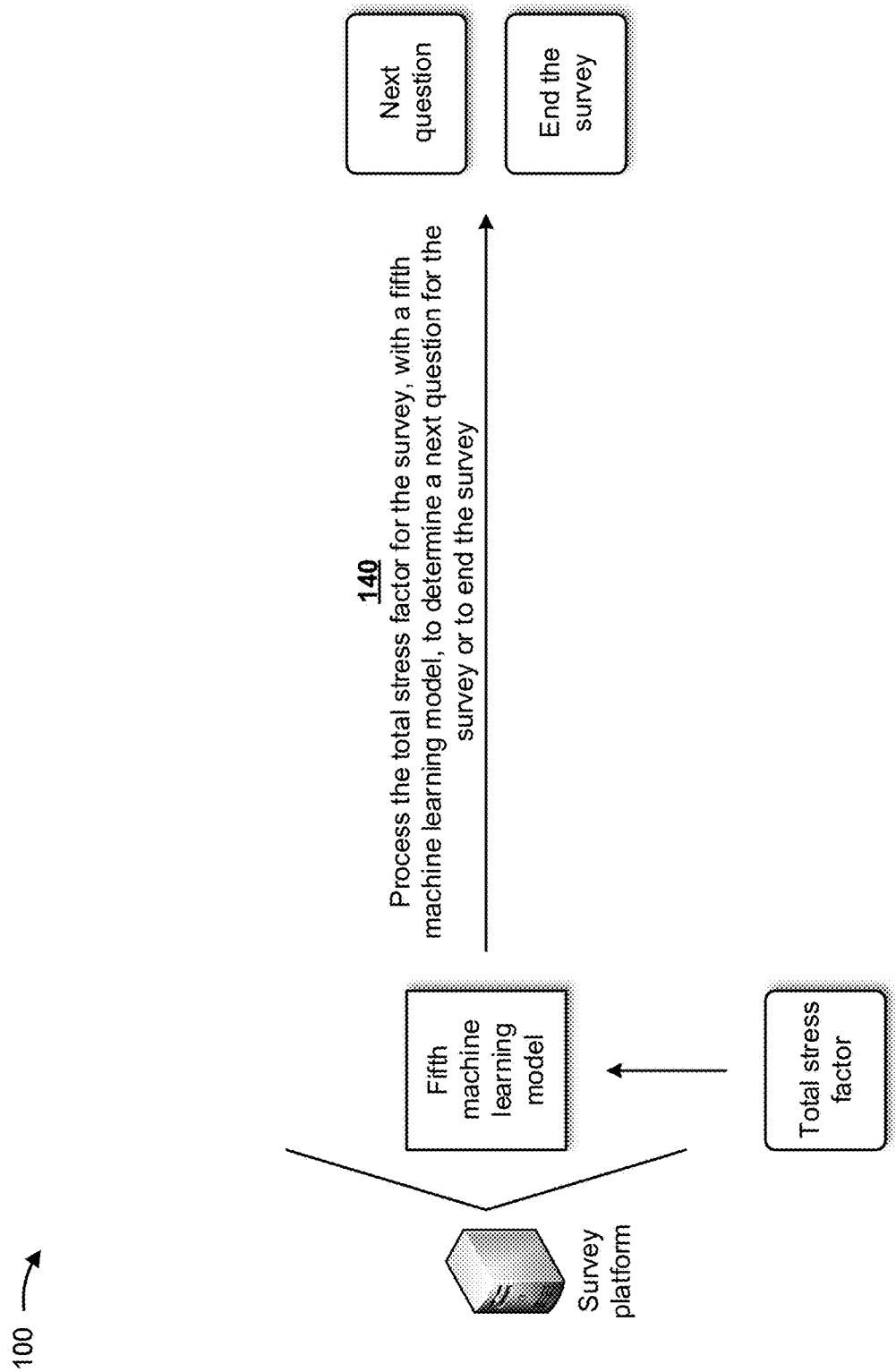

As shown in FIG. 1G, and by reference number 140, the survey platform may process the total stress factor for the survey, with a fifth machine learning model, to determine a next question for the survey or to end the survey. In some implementations, the fifth machine learning model may include a threshold model, a questionnaire tree model, and/or the like, that are created using one or more historical models, collaborative models, human expert labeling, and/or the like. In some implementations, the survey platform may provide the fifth machine learning model to the client device of the surveyor, and the client device may utilize the fifth machine learning model to determine a next question or to end the survey based on the total stress factor for the survey.

In some implementations, the survey platform may train the fifth machine learning model with historical total stress factor data, to determine a next question for a survey or whether to end the survey. For example, the survey platform may train the fifth machine learning model, in a manner similar to the first machine learning model described above in connection with FIG. 1C. In some implementations, rather than training the fifth machine learning model, the survey platform may obtain the fifth machine learning model from another system or device that trained the fifth machine learning model. In this case, the survey platform may provide the other system or device with the historical total stress factor data for use in training the fifth machine learning model, and may provide the other system or device with updated historical total stress factor data to retrain the fifth machine learning model in order to update the fifth machine learning model.

In some implementations, the fifth machine learning model may, for each survey question, determine a next action based on the human-related data, the environmental data, the high reliability context data, the low reliability context data, the weighted context data, the total stress factor, and/or the like. For example, for a particular question, if the participant stress level does not satisfy a first threshold (e.g., indicating a low participant stress level), the fifth machine learning model may direct the surveyor to directly ask the surveyed person the particular question. If the participant stress level satisfies a second threshold that is higher than the first threshold (e.g., indicating a high participant stress level), the fifth machine learning model may direct the surveyor to reschedule the survey for a later day and/or time. If the participant stress level satisfies the first threshold but does not satisfy the second threshold (e.g., indicating a moderate participant stress level), the survey platform may direct the surveyor to ask one or more probe questions to derive an answer to the particular question rather than directly asking the particular question.

Figure 1H:
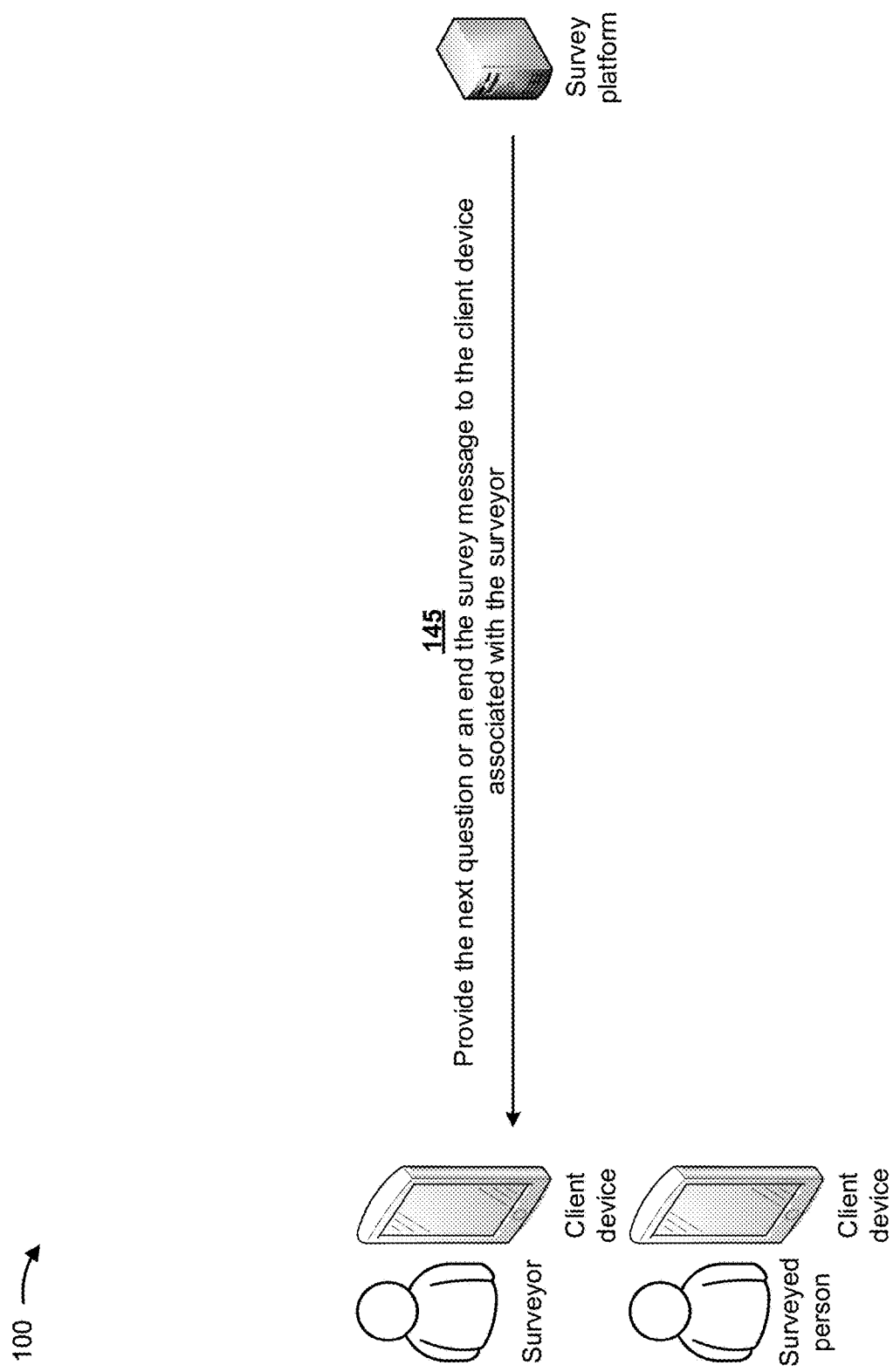

As shown in FIG. 1H, and by reference number 145, the survey platform may provide the next question or an end survey message to the client device associated with the surveyor. For example, as described above, the survey platform may provide to the client device associated with the surveyor a direct question to ask the surveyed person if the participant stress level does not satisfy the first threshold, may provide the end the survey message to the client device associated with the surveyor if the participant stress level satisfies the second threshold, may provide to the client device a probe question to ask the surveyed person if the participant stress level satisfies the first threshold but does not satisfy the second threshold, and/or the like.

As shown in FIG. 1I, and by reference number 150, the survey platform may perform one or more actions based on the total stress factor. In some implementations, the one or more actions may include the survey platform providing a message instructing the surveyor to calm down (e.g., change a tone of voice) during a next set of survey questions or to reschedule the survey. For example, the survey platform may determine that the surveyor is temporarily stressed out or temporarily in a bad mood, and may provide a message instructing the surveyor to tone down an emotion, intensity, and/or the like with which the next question is delivered. Alternatively, the survey platform may determine that the surveyor is continuously stressed out or continuously in a bad mood, and may instruct the surveyor to reschedule the survey to a different day and/or time. In this way, the survey platform may automatically recognize a need to adjust the survey based on the mood of the surveyor, and may automatically facilitate the adjustment, thereby improving reliability of the survey results and conserving resources (e.g., computing resources, networking resources, and/or the like) that would otherwise be wasted generating useless survey results, reperforming the survey, and/or the like.

In some implementations, the one or more actions may include the survey platform providing a message instructing the surveyor to ask a set of appropriate probe questions or to reschedule the survey. For example, the survey platform may determine that the surveyed person is temporarily stressed out or temporarily in a bad mood, and may adjust next questions to be asked of the surveyed person. Alternatively, the survey platform may determine that the surveyed person is continuously stressed out or continuously in a bad mood, and may instruct the surveyor to reschedule the survey to a different day and/or time. In this way, the survey platform may automatically recognize a need to adjust the survey based on the mood of the surveyed person, and may automatically facilitate the adjustment, thereby improving reliability of the survey results and conserving resources that would otherwise be wasted generating useless survey results, reperforming the survey, and/or the like.

In some implementations, the one or more actions may include the survey platform generating a new set of survey questions based on the total stress factor. For example, if the total stress factor indicates that the surveyed person may underreport a financial health of the surveyed person, the survey platform may instruct the surveyor to ask a set of questions relating to an occupation of the surveyed person, whether the surveyed person owns a house, and/or the like. In this way, the survey platform may automatically determine relevant additional information about the surveyed person, which may improve an reliability and/or an accuracy of the survey answers, thereby conserving resources that would otherwise be wasted generating useless survey results, reperforming the survey, and/or the like.

In some implementations, the one or more actions may include the survey platform modifying a next set of survey questions based on the total stress factor. For example, if the total stress factor indicates a presence of a crying infant with the surveyed person, the survey platform may modify a next set of survey questions to ascertain whether someone else is present who can care for the infant. In this way, the survey platform may automatically adapt the survey questions to an environment of the surveyed person, so that useful survey results are generated.

In some implementations, the one or more actions may include the survey platform modifying an environmental factor based on the total stress factor. For example, if the total stress factor indicates the presence of an influencer associated with the surveyed person, the survey platform may instruct the surveyor to ask the surveyed person if discussion can continue without the influencer being present. In this way, the survey platform may automatically detect an environmental factor that would interfere with obtaining accurate and/or unbiased survey results, thereby improving reliability of the survey results and conserving resources that would otherwise be wasted generating useless survey results, reperforming the survey, and/or the like.

In some implementations, the one or more actions may include the survey platform retraining the models based on the total stress factor. For example, the survey platform may retrain one or more of the first machine learning model, the second machine learning model, the third machine learning model, the fourth machine learning model, and/or the fifth machine learning model based on the total stress factor. In this way, the survey platform may improve the accuracy of the models in determining the reliabilities of the human-related data and the environmental data, the high-reliability context data, the low reliability context data, the weighted context data, the total stress factor, and/or the like, which may improve speed and efficiency of the models and conserve computing resources, networking resources, and/or the like.

As shown in FIG. 1J, the surveyor may conduct a survey with the surveyed person, such as a question and answer survey where the surveyor asks questions and the surveyed person provides answers to the questions. As further shown in FIG. 1J, and by reference number 155, the survey platform may receive, from the client device associated with the surveyor, data indicating that the surveyor is temporarily or continuously stressed out or in a bad mood (e.g., based on a voice of the surveyor captured by a microphone of the client device, based on a facial expression of the surveyor captured by a camera of the client device, and/or the like). As further shown in FIG. 1J, and by reference number 160, when the survey platform receives the data indicating that the surveyor is temporarily stressed out or in a bad mood, the survey platform may provide, to the client device associated with the surveyor, a message instructing the surveyor to calm down during a next set of survey questions or instructing the surveyor to reschedule the survey to some other date and time. The surveyor may receive the message, via the client device associated with surveyor, and may calm down or may reschedule the survey to some other date and time based on the message.

Figure 1K:
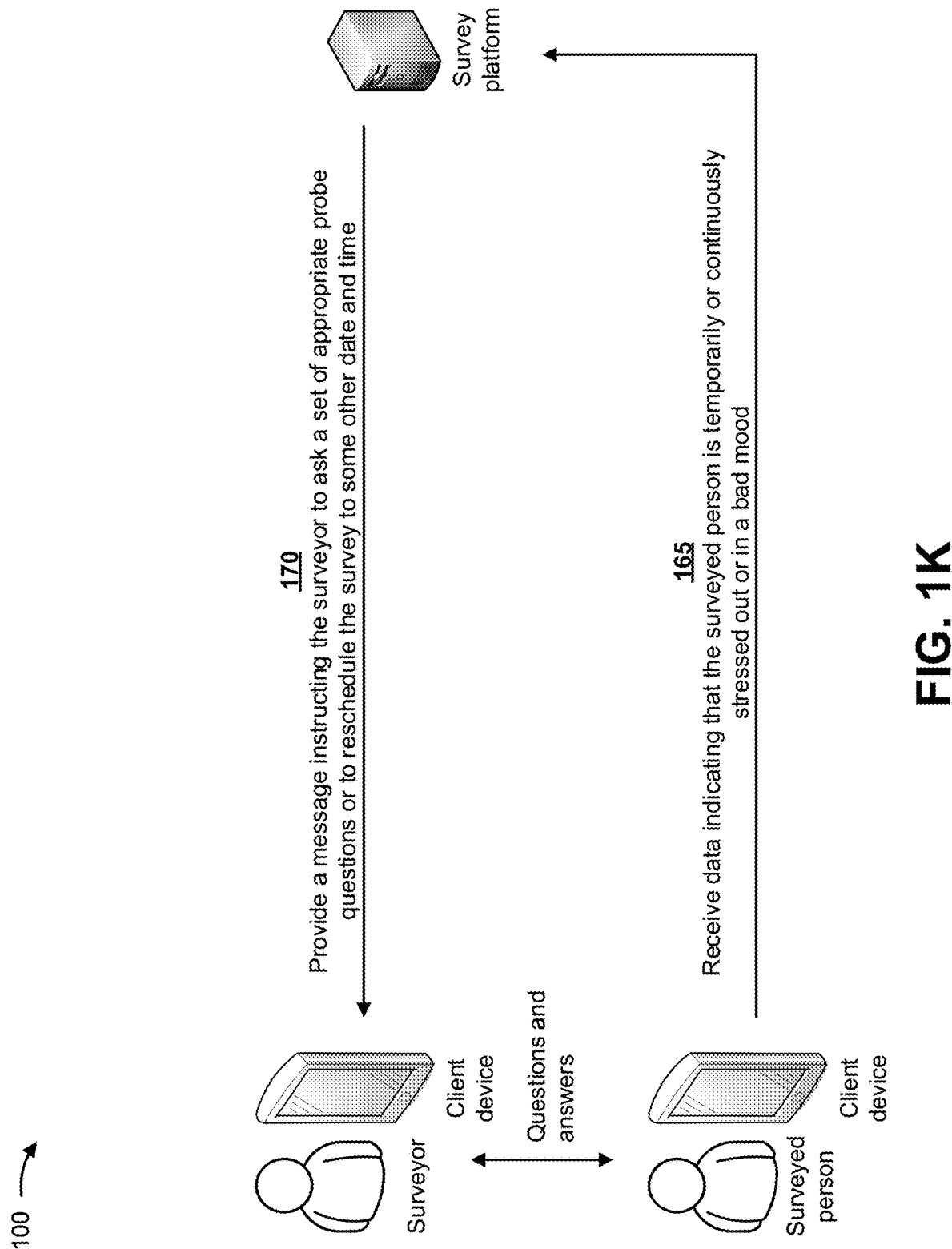

As shown in FIG. 1K, the surveyor may conduct a survey with the surveyed person, such as a question and answer survey where the surveyor asks questions and the surveyed person provides answers to the questions. As further shown in FIG. 1K, and by reference number 165, the survey platform may receive, from the client device associated with the surveyed person, data indicating that the surveyed person is temporarily or continuously stressed out or in a bad mood (e.g., based on a voice of the surveyed person captured by a microphone of the client device, based on a facial expression of the surveyed person captured by a camera of the client device, and/or the like). As further shown in FIG. 1K, and by reference number 170, when the survey platform receives data indicating that the surveyed person is temporarily stressed out or in a bad mood, the survey platform may provide, to the client device associated with the surveyor, a message instructing the surveyor to ask a set of appropriate probe questions or to reschedule the survey to some other date and time. The surveyor may receive the message, via the client device associated with surveyor, and may ask the set of appropriate probe questions or may reschedule the survey to some other date and time based on the message.

As shown in FIG. 1L, the surveyor may conduct a survey with the surveyed person, such as a question and answer survey where the surveyor asks questions and the surveyed person provides answers to the questions. As further shown in FIG. 1L, and by reference number 175, the survey platform may automatically detect unfavorable environmental conditions (e.g., based on receiving information indicating a meal time for the surveyed person, a baby crying captured by a microphone of the client device, a work distraction based on a calendar entry included in the client device, survey influencers, and/or the like) associated with the surveyed person. As further shown in FIG. 1L, and by reference number 180, when the survey platform automatically detects the unfavorable environmental conditions, the survey platform may provide, to the client device associated with the surveyor, a message instructing the surveyor to adjust the survey questions or to reschedule the survey to some other date and time. The surveyor may receive the message, via the client device associated with surveyor, and may adjust the survey questions or may reschedule the survey to some other date and time based on the message.

In some implementations, the client device of the surveyor may perform one or more of the functions described above for the survey platform when there is a constraint on network availability for the survey platform. For example, the survey platform may experience issues due to low network bandwidth, loss of network connectivity, a very long response time due to network service being slow or unavailable, and/or the like. The functions performed by the client device may result in low and/or medium accuracy with respect to context, but the client device may increase the accuracy of context by specifically asking for more input from the surveyor to arrive at a more reliable context.

In some implementations, in a normal scenario where network availability is good for the survey platform, context data (e.g., environmental data, such as data indicating light conditions, ambient noise conditions, ambient temperature conditions, ambient weather conditions, and/or the like, and human-related data, such as data identifying emotions, voice level, heart rate, and/or the like) may be extracted by the survey platform from raw sensor data by calling appropriate application programming interfaces (APIs), such as voice analysis APIs, image recognition APIs, heart rate calculation APIs, weather APIs, and/or the like.

However, in the absence of good network availability, where there is no possibility of calling the APIs, the survey platform may extract context data from the raw sensor data using local learned models. To arrive at more reliable outputs, the survey platform may augment the context data that are extracted from the local learned models with corresponding human inputs (e.g., answers to probe questions).

In this way, machine learning models are utilized to determine survey questions based on context of a person being surveyed, reactions to survey questions, and environmental conditions. The survey platform improves the performance of the survey by ensuring that a surveyed person's answers are received in an environment of least stress, thereby increasing a reliability of the answers. The survey platform utilizes environmental context in which the survey is being taken, changes in the environment that may occur while the survey is being taken, an emotional response of the surveyed person to determine a next set of survey questions, and/or the like. The survey platform also adapts to external conditions, such as network bandwidth, availability of network connectivity, and/or the like. This, in turn, conserves computing resources (e.g., processing resources, memory resources, communication resources, and/or the like), networking resources, and/or the like that would otherwise be wasted in generating unreliable survey results, performing additional surveys to improve the reliability of overall survey results, reviewing results of the additional surveys, asking unnecessary questions, continuing a fruitless survey, reperforming a survey with unreliable results, and/or the like.

Furthermore, several different stages of the process for determining survey questions based on context of a person being surveyed, reactions to survey questions, and environmental conditions may be automated via machine learning models, which may improve speed and efficiency of the process and conserve computing resources, networking resources, and/or the like. Implementations described herein use a rigorous, computerized process to perform tasks or roles that were not previously performed. For example, currently there does not exist a technique that utilizes machine learning to determine survey questions based on context of a person being surveyed, reactions to survey questions, and environmental conditions.

As indicated above, FIGS. 1A-1L are provided merely as examples. Other examples may differ from what is described with regard to FIGS. 1A-1L.

Figure 2:
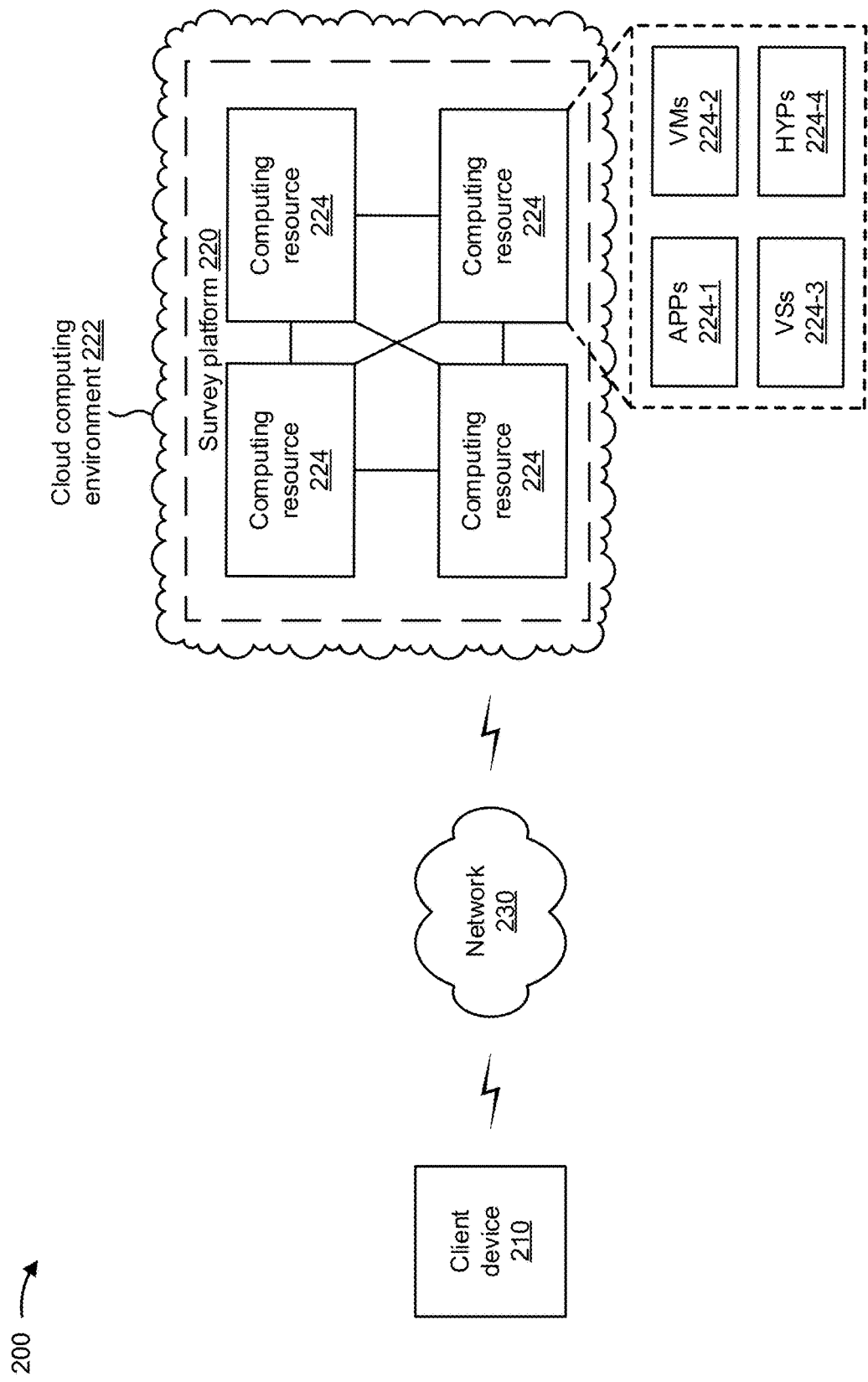
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a survey platform 220, and a network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a temperature sensor, a network probe, or a similar type of device. In some implementations, client device 210 may receive information from and/or transmit information to survey platform 220.

Survey platform 220 includes one or more devices that utilize machine learning to determine survey questions based on context of a person being surveyed, reactions to survey questions, and environmental conditions. In some implementations, survey platform 220 may be designed to be modular such that certain software components may be swapped in or out depending on a particular need. As such, survey platform 220 may be easily and/or quickly reconfigured for different uses. In some implementations, survey platform 220 may receive information from and/or transmit information to one or more client devices 210.

In some implementations, as shown, survey platform 220 may be hosted in a cloud computing environment 222. Notably, while implementations described herein describe survey platform 220 as being hosted in cloud computing environment 222, in some implementations, survey platform 220 may not be cloud-based (i.e., may be implemented outside of a cloud computing environment) or may be partially cloud-based.

Cloud computing environment 222 includes an environment that hosts survey platform 220. Cloud computing environment 222 may provide computation, software, data access, storage, etc., services that do not require end-user knowledge of a physical location and configuration of system(s) and/or device(s) that hosts survey platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host survey platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with survey platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of survey platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
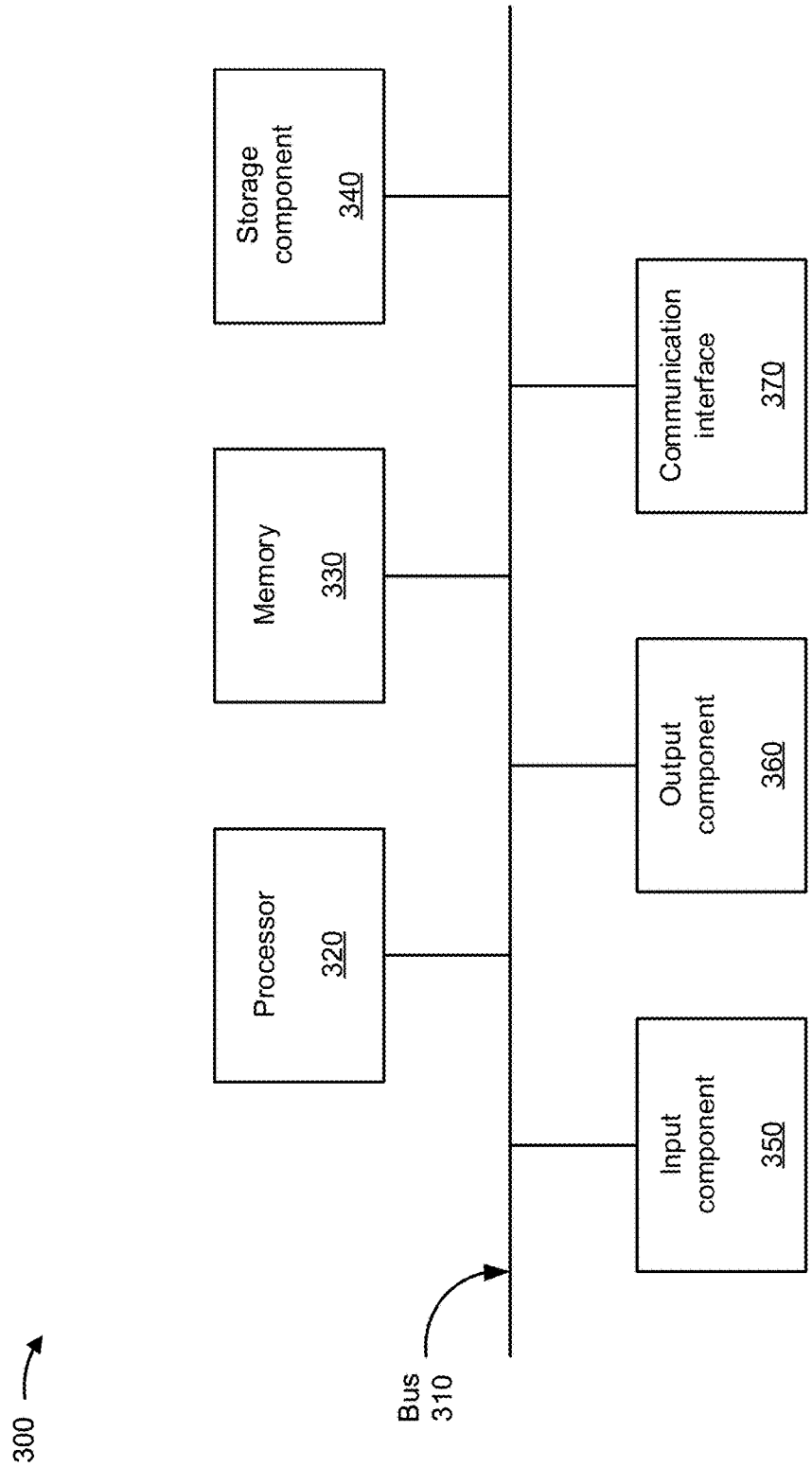
FIG. 3 is a diagram of example components of one or more devices of FIG. 2.

FIG. 3 is a diagram of example components of a device 300. Device 300 may correspond to client device 210, survey platform 220, and/or computing resource 224. In some implementations, client device 210, survey platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
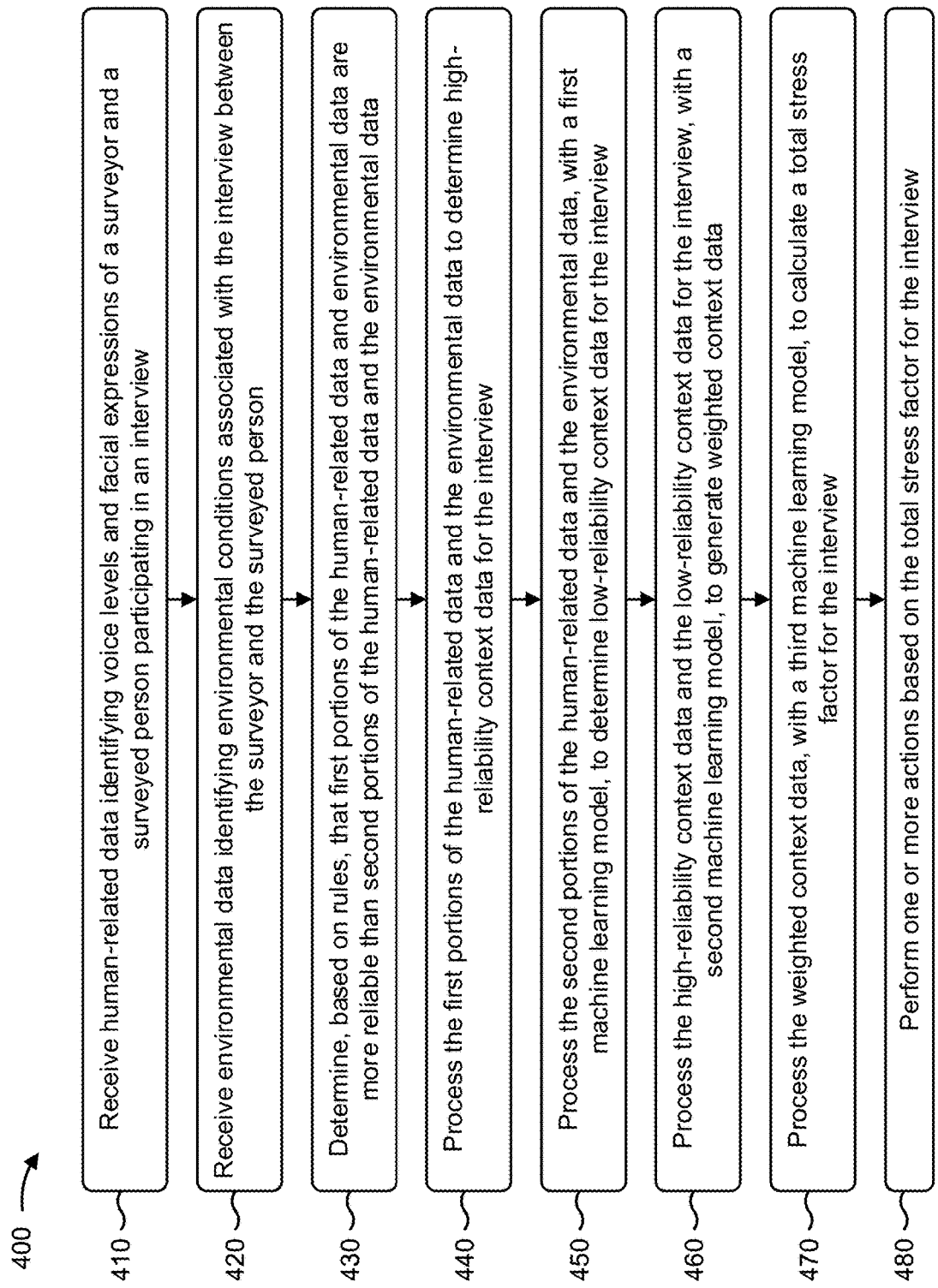
FIGS. 4-6 are flow charts of example processes for utilizing machine learning to determine survey questions based on context of a person being surveyed, reactions to survey questions, and environmental conditions.

FIG. 4 is a flow chart of an example process 400 for utilizing machine learning to determine survey questions based on context of a person being surveyed, reactions to survey questions, and environmental conditions. In some implementations, one or more process blocks of FIG. 4 may be performed by a device (e.g., survey platform 220). In some implementations, one or more process blocks of FIG.

4 may be performed by another device or a group of devices separate from or including the device, such as a client device (e.g., client device 210).

As shown in FIG. 4, process 400 may include receiving human-related data identifying voice levels and facial expressions of a surveyor and a surveyed person participating in an interview (block 410). For example, the device (e.g., using computing resource 224, processor 320, communication interface 370, and/or the like) may receive human-related data identifying voice levels and facial expressions of a surveyor and a surveyed person participating in an interview, as described above.

As further shown in FIG. 4, process 400 may include receiving environmental data identifying environmental conditions associated with the interview between the surveyor and the surveyed person (block 420). For example, the device (e.g., using computing resource 224, processor 320, communication interface 370, and/or the like) may receive environmental data identifying environmental conditions associated with the interview between the surveyor and the surveyed person, as described above.

As further shown in FIG. 4, process 400 may include determining, based on rules, that first portions of the human-related data and environmental data are more reliable than second portions of the human-related data and the environmental data (block 430). For example, the device (e.g., using computing resource 224, processor 320, memory 330, and/or the like) may determine, based on rules, that first portions of the human-related data and environmental data are more reliable than second portions of the human-related data and the environmental data, as described above.

As further shown in FIG. 4, process 400 may include processing the first portions of the human-related data and the environmental data to determine high-reliability context data for the interview (block 440). For example, the device (e.g., using computing resource 224, processor 320, storage component 340, and/or the like) may process the first portions of the human-related data and the environmental data to determine high-reliability context data for the interview, as described above.

As further shown in FIG. 4, process 400 may include processing the second portions of the human-related data and the environmental data, with a first machine learning model, to determine low-reliability context data for the interview (block 450). For example, the device (e.g., using computing resource 224, processor 320, memory 330, storage component 340, and/or the like) may process the second portions of the human-related data and the environmental data, with a first machine learning model, to determine low-reliability context data for the interview, as described above.

As further shown in FIG. 4, process 400 may include processing the high-reliability context data and the low-reliability context data for the interview, with a second machine learning model, to generate weighted context data (block 460). For example, the device (e.g., using computing resource 224, processor 320, memory 330, and/or the like) may process the high-reliability context data and the low-reliability context data for the interview, with a second machine learning model, to generate weighted context data, as described above.

As further shown in FIG. 4, process 400 may include processing the weighted context data, with a third machine learning model, to calculate a total stress factor for the interview (block 470). For example, the device (e.g., using computing resource 224, processor 320, storage component 340, and/or the like) may process the weighted context data, with a third machine learning model, to calculate a total stress factor for the interview, as described above.

As further shown in FIG. 4, process 400 may include performing one or more actions based on the total stress factor for the interview (block 480). For example, the device (e.g., using computing resource 224, processor 320, memory 330, storage component 340, communication interface 370, and/or the like) may perform one or more actions based on the total stress factor for the interview, as described above.

Process 400 may include additional implementations, such as any single implementation or any combination of implementations described below and/or in connection with one or more other processes described elsewhere herein.

In a first implementation, performing the one or more actions may include processing the total stress factor for the interview, with a fourth machine learning model, to determine a next question for the interview or to determine to end the interview, and providing the next question or an instruction to end the interview to a client device associated with the surveyor.

In a second implementation, alone or in combination with the first implementation, performing the one or more actions may include providing, to a client device associated with the surveyor, a message instructing the surveyor.

In a third implementation, alone or in combination with one or more of the first and second implementations, performing the one or more actions may include providing, to a client device associated with the surveyor, a message instructing the surveyor.

In a fourth implementation, alone or in combination with one or more of the first through third implementations, performing the one or more actions may include generating a new set of interview questions, for the interview, based on the total stress factor; or modifying a next set of interview questions, for the interview, based on the total stress factor.

In a fifth implementation, alone or in combination with one or more of the first through fourth implementations, performing the one or more actions may include modifying an environmental factor, associated with the interview, based on the total stress factor, or retraining one or more of the first machine learning model, the second machine learning model, or the third machine learning model based on the total stress factor.

In a sixth implementation, alone or in combination with one or more of the first through fifth implementations, process 400 may include receiving, via the human-related data or the environmental data, data indicating that the surveyor is temporarily or continuously stressed out or in a bad mood; and providing, to a client device associated with the surveyor, a message instructing the surveyor to calm down during a next set of interview questions or instructing the surveyor to reschedule the interview to some other date and time, where the message may be provided based on the data indicating that the surveyor is temporarily or continuously stressed out or in the bad mood.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
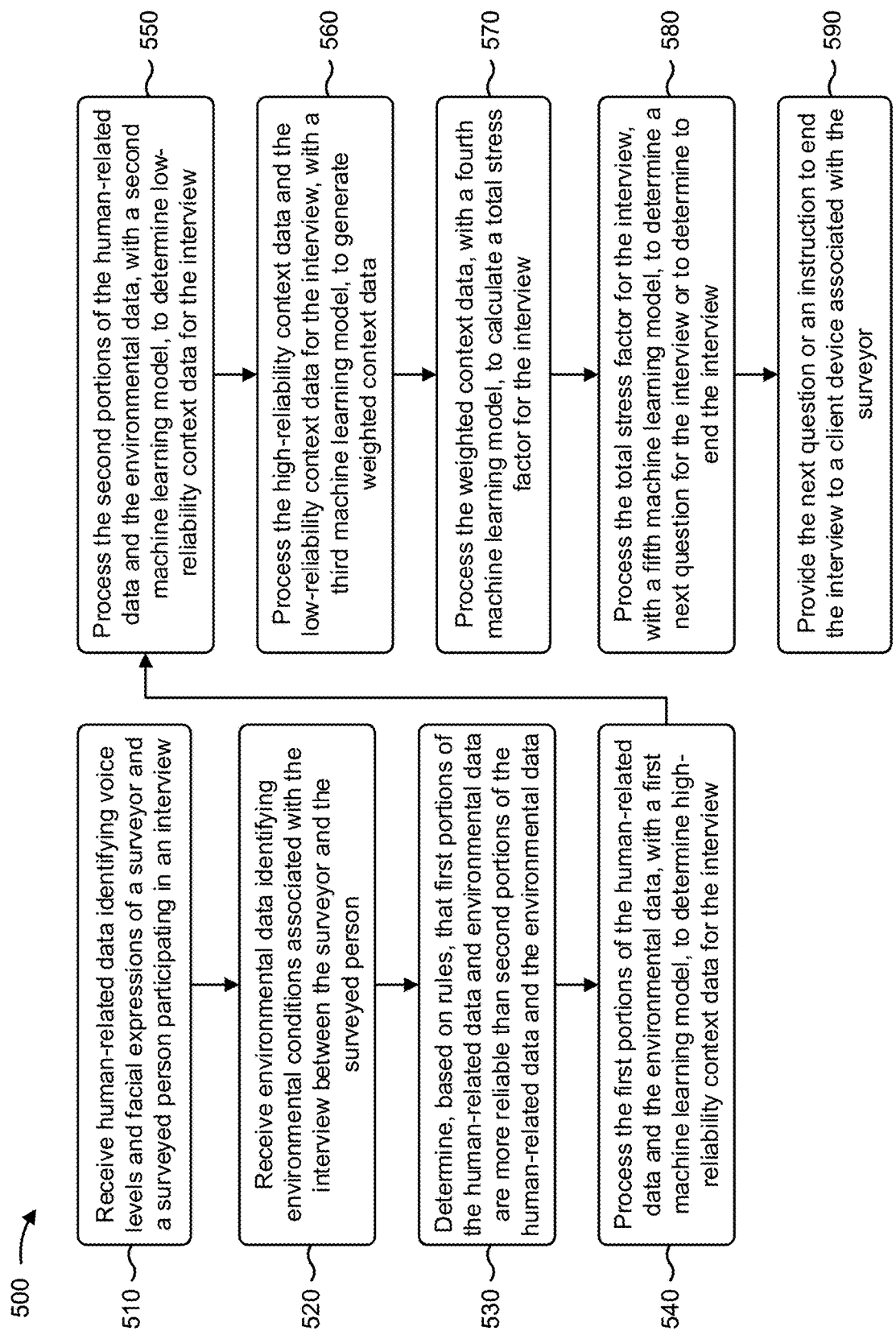

FIG. 5 is a flow chart of an example process 500 for utilizing machine learning to determine survey questions based on context of a person being surveyed, reactions to survey questions, and environmental conditions. In some implementations, one or more process blocks of FIG. 5 may be performed by a device (e.g., survey platform 220). In some implementations, one or more process blocks of FIG. 5 may be performed by another device or a group of devices separate from or including the device, such as a client device (e.g., client device 210).

As shown in FIG. 5, process 500 may include receiving human-related data identifying voice levels and facial expressions of a surveyor and a surveyed person participating in an interview (block 510). For example, the device (e.g., using computing resource 224, processor 320, communication interface 370, and/or the like) may receive human-related data identifying voice levels and facial expressions of a surveyor and a surveyed person participating in an interview, as described above.

As further shown in FIG. 5, process 500 may include receiving environmental data identifying environmental conditions associated with the interview between the surveyor and the surveyed person (block 520). For example, the device (e.g., using computing resource 224, processor 320, communication interface 370, and/or the like) may receive environmental data identifying environmental conditions associated with the interview between the surveyor and the surveyed person, as described above.

As further shown in FIG. 5, process 500 may include determining, based on rules, that first portions of the human-related data and environmental data are more reliable than second portions of the human-related data and the environmental data (block 530). For example, the device (e.g., using computing resource 224, processor 320, memory 330, and/or the like) may determine, based on rules, that first portions of the human-related data and environmental data are more reliable than second portions of the human-related data and the environmental data, as described above.

As further shown in FIG. 5, process 500 may include processing the first portions of the human-related data and the environmental data, with a first machine learning model, to determine high-reliability context data for the interview (block 540). For example, the device (e.g., using computing resource 224, processor 320, storage component 340, and/or the like) may process the first portions of the human-related data and the environmental data, with a first machine learning model, to determine high-reliability context data for the interview, as described above.

As further shown in FIG. 5, process 500 may include processing the second portions of the human-related data and the environmental data, with a second machine learning model, to determine low-reliability context data for the interview (block 550). For example, the device (e.g., using computing resource 224, processor 320, memory 330, storage component 340, and/or the like) may process the second portions of the human-related data and the environmental data, with a second machine learning model, to determine low-reliability context data for the interview, as described above.

As further shown in FIG. 5, process 500 may include processing the high-reliability context data and the low-reliability context data for the interview, with a third machine learning model, to generate weighted context data (block 560). For example, the device (e.g., using computing resource 224, processor 320, memory 330, and/or the like) may process the high-reliability context data and the low-reliability context data for the interview, with a third machine learning model, to generate weighted context data, as described above.

As further shown in FIG. 5, process 500 may include processing the weighted context data, with a fourth machine learning model, to calculate a total stress factor for the interview (block 570). For example, the device (e.g., using computing resource 224, processor 320, storage component 340, and/or the like) may process the weighted context data, with a fourth machine learning model, to calculate a total stress factor for the interview, as described above.

As further shown in FIG. 5, process 500 may include processing the total stress factor for the interview, with a fifth machine learning model, to determine a next question for the interview or to determine to end the interview (block 580). For example, the device (e.g., using computing resource 224, processor 320, memory 330, and/or the like) may process the total stress factor for the interview, with a fifth machine learning model, to determine a next question for the interview or to determine to end the interview, as described above.

As further shown in FIG. 5, process 500 may include providing the next question or an instruction to end the interview to a client device associated with the surveyor (block 590). For example, the device (e.g., using computing resource 224, processor 320, memory 330, communication interface 370, and/or the like) may provide the next question or an instruction to end the interview to a client device associated with the surveyor, as described above.

Process 500 may include additional implementations, such as any single implementation or any combination of implementations described below and/or in connection with one or more other processes described elsewhere herein.

In a first implementation, process 500 may include receiving, via the human-related data or the environmental data, data indicating that the surveyed person is temporarily or continuously stressed out or in a bad mood; and providing, to the client device associated with the surveyed person, a message instructing the surveyor to ask a set of appropriate probe questions or instructing the surveyor to reschedule the interview to some other date and time, where the message may be provided based on the data indicating that the surveyed person is temporarily or continuously stressed out or in the bad mood.

In a second implementation, alone or in combination with the first implementation, process 500 may include automatically detecting unfavorable environmental conditions associated with the surveyed person; and providing, to the client device associated with the surveyor, a message instructing the surveyor to adjust the interview questions or instructing the surveyor to reschedule the interview to some other date and time.

In a third implementation, alone or in combination with one or more of the first and second implementations, process 500 may include automatically detecting unfavorable environmental conditions associated with the surveyor; and providing, to the client device associated with the surveyor, a message instructing the surveyor to improve the unfavorable environmental conditions.

In a fourth implementation, alone or in combination with one or more of the first through third implementations, receiving the human-related data may include receiving sensor data associated with the surveyor and the surveyed person, and utilizing one or more application programming interfaces (APIs) to extract the human-related data from the sensor data.

In a fifth implementation, alone or in combination with one or more of the first through fourth implementations, receiving the environmental data may include receiving sensor data associated with an environment of the interview, and utilizing one or more APIs to extract the environmental data from the sensor data.

In a sixth implementation, alone or in combination with one or more of the first through fifth implementations, the environmental data may include data identifying one or more of a light intensity of a location associated with the surveyor or the surveyed person, a noise level of the location associated with the surveyor or the surveyed person, a temperature of the location associated with the surveyor or the surveyed person, or weather conditions of the location associated with the surveyor or the surveyed person.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
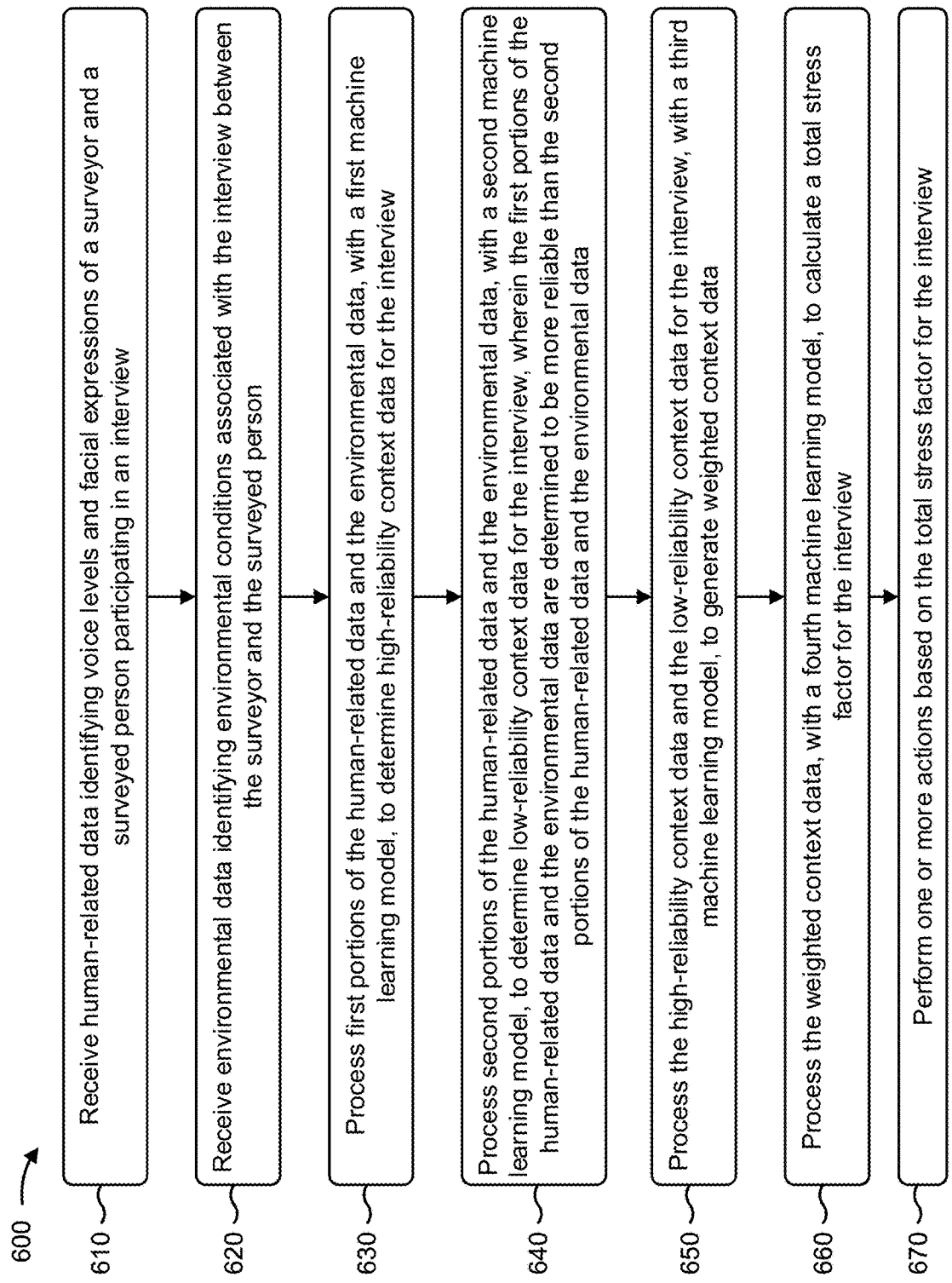

FIG. 6 is a flow chart of an example process 600 for utilizing machine learning to determine survey questions based on context of a person being surveyed, reactions to survey questions, and environmental conditions. In some implementations, one or more process blocks of FIG. 6 may be performed by a device (e.g., survey platform 220). In some implementations, one or more process blocks of FIG. 6 may be performed by another device or a group of devices separate from or including the device, such as a client device (e.g., client device 210).

As shown in FIG. 6, process 600 may include receiving human-related data identifying voice levels and facial expressions of a surveyor and a surveyed person participating in an interview (block 610). For example, the device (e.g., using computing resource 224, processor 320, communication interface 370, and/or the like) may receive human-related data identifying voice levels and facial expressions of a surveyor and a surveyed person participating in an interview, as described above.

As further shown in FIG. 6, process 600 may include receiving environmental data identifying environmental conditions associated with the interview between the surveyor and the surveyed person (block 620). For example, the device (e.g., using computing resource 224, processor 320, communication interface 370, and/or the like) may receive environmental data identifying environmental conditions associated with the interview between the surveyor and the surveyed person, as described above.

As further shown in FIG. 6, process 600 may include processing first portions of the human-related data and the environmental data, with a first machine learning model, to determine high-reliability context data for the interview (block 630). For example, the device (e.g., using computing resource 224, processor 320, memory 330, and/or the like) may process first portions of the human-related data and the environmental data, with a first machine learning model, to determine high-reliability context data for the interview, as described above.

As further shown in FIG. 6, process 600 may include processing second portions of the human-related data and the environmental data, with a second machine learning model, to determine low-reliability context data for the interview, wherein the first portions of the human-related data and the environmental data are determined to be more reliable than the second portions of the human-related data and the environmental data (block 640). For example, the device (e.g., using computing resource 224, processor 320, storage component 340, and/or the like) may process second portions of the human-related data and the environmental data, with a second machine learning model, to determine low-reliability context data for the interview, as described above. In some implementations, the first portions of the human-related data and the environmental data may be determined to be more reliable than the second portions of the human-related data and the environmental data.

As further shown in FIG. 6, process 600 may include processing the high-reliability context data and the low-reliability context data for the interview, with a third machine learning model, to generate weighted context data (block 650). For example, the device (e.g., using computing resource 224, processor 320, memory 330, and/or the like) may process the high-reliability context data and the low-reliability context data for the interview, with a third machine learning model, to generate weighted context data, as described above.

As further shown in FIG. 6, process 600 may include processing the weighted context data, with a fourth machine learning model, to calculate a total stress factor for the interview (block 660). For example, the device (e.g., using computing resource 224, processor 320, storage component 340, and/or the like) may process the weighted context data, with a fourth machine learning model, to calculate a total stress factor for the interview, as described above.

As further shown in FIG. 6, process 600 may include performing one or more actions based on the total stress factor for the interview (block 670). For example, the device (e.g., using computing resource 224, processor 320, memory 330, storage component 340, communication interface 370, and/or the like) may perform one or more actions based on the total stress factor for the interview, as described above.

Process 600 may include additional implementations, such as any single implementation or any combination of implementations described below and/or in connection with one or more other processes described elsewhere herein.

In a first implementation, process 600 may include processing the total stress factor for the interview, with a fifth machine learning model, to determine a next question for the interview or to determine to end the interview; and providing the next question or an instruction to end the interview to a client device associated with the surveyor.

In a second implementation, alone or in combination with the first implementation, process 600 may include receiving, via the human-related data or the environmental data, data indicating that the surveyor is temporarily or continuously stressed out or in a bad mood; and providing, to a client device associated with the surveyor, a message instructing the surveyor to calm down during a next set of interview questions or instructing the surveyor to reschedule the interview to some other date and time, wherein the message may be provided based on the data indicating that the surveyor is temporarily or continuously stressed out or in the bad mood.

In a third implementation, alone or in combination with one or more of the first and second implementations, process 600 may include receiving, via the human-related data or the environmental data, data indicating that the surveyed person is temporarily or continuously stressed out or in a bad mood; and providing, to a client device associated with the surveyed person, a message instructing the surveyor to ask a set of appropriate probe questions or instructing the surveyor to reschedule the interview to some other date and time, wherein the message may be provided based on the data indicating that the surveyed person is temporarily or continuously stressed out or in the bad mood.

In a fourth implementation, alone or in combination with one or more of the first through third implementations, process 600 may include automatically detecting unfavorable environmental conditions associated with the surveyor or the surveyed person; and providing, to a client device associated with the surveyor, a message instructing the surveyor to adjust the interview questions or instructing the surveyor to reschedule the interview to some other date and time, wherein the message may be provided based on detecting the unfavorable environmental conditions associated with the surveyor or the surveyed person.

In a fifth implementation, alone or in combination with one or more of the first through fourth implementations, performing the one or more actions may include generating a new set of interview questions, for the interview, based on the total stress factor; modifying a next set of interview questions, for the interview, based on the total stress factor; or modifying an environmental factor, associated with the interview, based on the total stress factor.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, human-related data identifying voice levels and facial expressions of a surveyor and a surveyed person participating in an interview;
    receiving, by the device, environmental data identifying environmental conditions associated with the interview between the surveyor and the surveyed person;
    determining, by the device and based on rules, that first portions of the human-related data and environmental data are more reliable than second portions of the human-related data and the environmental data;
    processing, by the device, the first portions of the human-related data and the environmental data to determine high-reliability context data for the interview;
    processing, by the device, the second portions of the human-related data and the environmental data, with a first machine learning model, to determine low-reliability context data for the interview;
    processing, by the device, the high-reliability context data and the low-reliability context data for the interview, with a second machine learning model, to generate weighted context data;
    processing, by the device, the weighted context data, with a third machine learning model, to calculate a total stress factor for the interview;
    performing, by the device, one or more actions based on the total stress factor for the interview;
    processing, by the device, the total stress factor for the interview, with a fourth machine learning model, to determine a next question for the interview or to determine to end the interview; and
    providing, by the device, the next question or an instruction to end the interview to a client device associated with the surveyor.

2. The method of claim 1, wherein performing the one or more actions comprises:
    providing, to the client device, a message instructing the surveyor to:
    calm down during a next set of interview questions, or reschedule the interview.

3. The method of claim 1, wherein performing the one or more actions comprises:
    providing, to the client device, a message instructing the surveyor to:
    ask a set of appropriate probe questions, or reschedule the interview.

4. The method of claim 1, wherein performing the one or more actions comprises one or more of:
    generating a new set of interview questions, for the interview, based on the total stress factor; or
    modifying a next set of interview questions, for the interview, based on the total stress factor.

5. The method of claim 1, wherein performing the one or more actions comprises one or more of:
    modifying an environmental factor, associated with the interview, based on the total stress factor; or
    retraining one or more of the first machine learning model, the second machine learning model, or the third machine learning model based on the total stress factor.

6. The method of claim 1, further comprising:
    receiving, via the human-related data or the environmental data, data indicating that the surveyor is temporarily or continuously stressed out or in a bad mood; and
    providing, to the client device, a message instructing the surveyor to calm down during a next set of interview questions or instructing the surveyor to reschedule the interview to some other date and time,
    wherein the message is provided based on the data indicating that the surveyor is temporarily or continuously stressed out or in the bad mood.

7. The method of claim 1, wherein processing, by the device, the total stress factor for the interview, with the fourth machine learning model, to determine the next question for the interview or to determine to end the interview comprises:
    determining whether the total stress factor meets a threshold stress factor; and
    selectively:
        determining the next question for the interview if the total stress factor does not meet the threshold stress factor, or
        determining to end the interview if the total stress factor does meet the threshold stress factor.

8. A device, comprising:
    one or more memories; and
    one or more processors, communicatively coupled to the one or more memories, configured to:
        receive human-related data identifying voice levels and facial expressions of a surveyor and a surveyed person participating in an interview;
        receive environmental data identifying environmental conditions associated with the interview between the surveyor and the surveyed person;
        determine, based on rules, that first portions of the human-related data and environmental data are more reliable than second portions of the human-related data and the environmental data;
        process the first portions of the human-related data and the environmental data, with a first machine learning model, to determine high-reliability context data for the interview;
        process the second portions of the human-related data and the environmental data, with a second machine learning model, to determine low-reliability context data for the interview;
        process the high-reliability context data and the low-reliability context data for the interview, with a third machine learning model, to generate weighted context data;
        process the weighted context data, with a fourth machine learning model, to calculate a total stress factor for the interview;
        process the total stress factor for the interview, with a fifth machine learning model, to determine a next question for the interview or to determine to end the interview; and
        provide the next question or an instruction to end the interview to a client device associated with the surveyor.

9. The device of claim 8, wherein the one or more processors are further configured to:
    receive, via the human-related data or the environmental data, data indicating that the surveyed person is temporarily or continuously stressed out or in a bad mood; and
    provide, to the client device associated with the surveyor, a message instructing the surveyor to ask a set of appropriate probe questions or instructing the surveyor to reschedule the interview to some other date and time,
        wherein the message is provided based on the data indicating that the surveyed person is temporarily or continuously stressed out or in the bad mood.

10. The device of claim 8, wherein the one or more processors are further configured to:
    automatically detect unfavorable environmental conditions associated with the surveyed person; and
    provide, to the client device associated with the surveyor, a message instructing the surveyor to adjust one or more interview questions or instructing the surveyor to reschedule the interview to some other date and time,
        wherein the message is provided based on detecting the unfavorable environmental conditions associated with the surveyed person.

11. The device of claim 8, wherein the one or more processors are further configured to:
    automatically detect unfavorable environmental conditions associated with the surveyor; and
    provide, to the client device associated with the surveyor, a message instructing the surveyor to improve the unfavorable environmental conditions,
        wherein the message is provided based on detecting the unfavorable environmental conditions associated with the surveyor.

12. The device of claim 8, wherein the one or more processors, when receiving the human-related data, are configured to:
    receive sensor data associated with the surveyor and the surveyed person; and
    utilize one or more application programming interfaces (APIs) to extract the human-related data from the sensor data.

13. The device of claim 8, wherein the one or more processors, when receiving the environmental data, are configured to:
    receive sensor data associated with an environment of the interview; and
    utilize one or more application programming interfaces (APIs) to extract the environmental data from the sensor data.

14. The device of claim 8, wherein the environmental data includes data identifying one or more of:
    a light intensity of a location associated with the surveyor or the surveyed person,
    a noise level of the location associated with the surveyor or the surveyed person,
    a temperature of the location associated with the surveyor or the surveyed person, or weather conditions of the location associated with the surveyor or the surveyed person.

15. A non-transitory computer-readable medium storing instructions, the instructions comprising:
    one or more instructions that, when executed by one or more processors, cause the one or more processors to:
        receive human-related data identifying voice levels and facial expressions of a surveyor and a surveyed person participating in an interview;
        receive environmental data identifying environmental conditions associated with the interview between the surveyor and the surveyed person;
        process first portions of the human-related data and the environmental data, with a first machine learning model, to determine high-reliability context data for the interview;
        process second portions of the human-related data and the environmental data, with a second machine learning model, to determine low-reliability context data for the interview,
            wherein the first portions of the human-related data and the environmental data are determined to be more reliable than the second portions of the human-related data and the environmental data;

process the high-reliability context data and the low-reliability context data for the interview, with a third machine learning model, to generate weighted context data;
process the weighted context data, with a fourth machine learning model, to calculate a total stress factor for the interview;
perform one or more actions based on the total stress factor for the interview;
process the total stress factor for the interview, with a fifth machine learning model, to determine a next question for the interview or to determine to end the interview; and
provide the next question or an instruction to end the interview to a client device associated with the surveyor.

16. The non-transitory computer-readable medium of claim 15, wherein the instructions further comprise:
one or more instructions that, when executed by one or more processors, cause the one or more processors to:
receive, via the human-related data or the environmental data, data indicating that the surveyor is temporarily or continuously stressed out or in a bad mood; and
provide, to the client device, a message instructing the surveyor to calm down during a next set of interview questions or instructing the surveyor to reschedule the interview to some other date and time,
wherein the message is provided based on the data indicating that the surveyor is temporarily or continuously stressed out or in the bad mood.

17. The non-transitory computer-readable medium of claim 15, wherein the instructions further comprise:
one or more instructions that, when executed by one or more processors, cause the one or more processors to:
receive, via the human-related data or the environmental data, data indicating that the surveyed person is temporarily or continuously stressed out or in a bad mood; and
provide, to the client device, a message instructing the surveyor to ask a set of appropriate probe questions or instructing the surveyor to reschedule the interview to some other date and time,
wherein the message is provided based on the data indicating that the surveyed person is temporarily or continuously stressed out or in the bad mood.

18. The non-transitory computer-readable medium of claim 15, wherein the instructions further comprise:
one or more instructions that, when executed by one or more processors, cause the one or more processors to:
automatically detect unfavorable environmental conditions associated with the surveyor or the surveyed person; and
provide, to the client device, a message instructing the surveyor to adjust interview questions or instructing the surveyor to reschedule the interview to some other date and time,
wherein the message is provided based on detecting the unfavorable environmental conditions associated with the surveyor or the surveyed person.

19. The non-transitory computer-readable medium of claim 15, wherein the one or more instructions, that cause the one or more processors to perform the one or more actions, cause the one or more processors to:
generate a new set of interview questions, for the interview, based on the total stress factor;
modify a next set of interview questions, for the interview, based on the total stress factor; or
modify an environmental factor, associated with the interview, based on the total stress factor.

20. The non-transitory computer-readable medium of claim 15, wherein the one or more instructions, that cause the one or more processors to process the total stress factor for the interview with the fourth machine learning model to determine the next question for the interview or to determine to end the interview, cause the one or more processors to:
determine whether the total stress factor meets a threshold stress factor; and
selectively:
determine the next question for the interview if the total stress factor does not meet the threshold stress factor, or
determine to end the interview if the total stress factor does meet the threshold stress factor.

* * * * *